United States Patent
Hirata et al.

[11] Patent Number: 6,117,538
[45] Date of Patent: Sep. 12, 2000

[54] DEOXIDIZING MULTILAYERED BODY AND METHOD OR MANUFACTURING THE SAME

[75] Inventors: Masukazu Hirata; Yoshinori Mabuchi; Hiroshi Hasegawa; Chihara Nisizawa; Hideyuki Takahashi, all of Tokyo, Japan

[73] Assignee: Mitsubishi Gas Chemical Company, Inc., Tokyo, Japan

[21] Appl. No.: 08/894,562

[22] PCT Filed: Dec. 26, 1996

[86] PCT No.: PCT/JP96/03836

§ 371 Date: Jan. 15, 1998

§ 102(e) Date: Jan. 15, 1998

[87] PCT Pub. No.: WO97/24228

PCT Pub. Date: Jul. 10, 1997

[30] Foreign Application Priority Data

Dec. 27, 1995 [JP] Japan .................................... 7-340669
Dec. 27, 1995 [JP] Japan .................................... 7-340670

[51] Int. Cl.[7] ................ B32B 5/18; B32B 31/00
[52] U.S. Cl. ................ 428/315.9; 156/229; 156/299; 156/300; 428/317.9; 428/319.7; 428/319.9; 428/910

[58] Field of Search ............... 428/315.9, 317.9, 428/319.7, 319.9, 910; 156/299, 300, 229

[56] References Cited

U.S. PATENT DOCUMENTS 5,116,660  5/1992  Komatsu et al. ................. 428/192
5,143,763  9/1992  Yamada et al. ................. 528/36.2

FOREIGN PATENT DOCUMENTS 5-131587  5/1993  Japan .

*Primary Examiner*—Blaine Copenheaver
*Attorney, Agent, or Firm*—Nixon Peabody LLP; Thomas W. Cole

[57] ABSTRACT

An oxygen absorbent is provided which includes a multi-layered body formed from a plurality of thin resin layers laminated over one another. At least one laminated side of this multilayered body is constructed as an oxygen-absorbing surface. The multilayered body includes an oxygen-absorbing layer of a resin composition in which an oxygen-absorbing component is dispersed and which is made porous; a non-porous oxygen-permeable layer which is permeable to oxygen; and a porous oxygen-permeable layer which serves as a protection layer for the non-porous oxygen-permeable layer. The layers are thermally bonded to one another and the resulting laminate is drawn to simultaneously enlarge the pores in the porous layers.

27 Claims, 2 Drawing Sheets

DEOXIDIZING MULTILAYERED BODY AND METHOD OR MANUFACTURING THE SAME

TECHNICAL FIELD

The present invention relates to an oxygen-absorbing multilayered body for absorbing oxygen and a manufacturing method thereof. More particularly, this oxygen-absorbing multilayered body is formed in a film or sheet shape which is preferable as a packaging material. The oxygen-absorbing multilayered body generally has a multi-layered construction and is provided with water and oil resistance. This film-shaped or sheet-shaped oxygen-absorbing multilayered body is used as a container or package to preserve various kinds of products such as food, medicines and metal products which tend to easily deteriorate due to an influence of oxygen in order to prevent such products from oxidizing.

BACKGROUND ART

In order to prevent various kinds of products such as food, medicines and metal products, which tend to easily deteriorate due to an influence of oxygen, from oxidizing, oxygen absorbers which remove oxygen from a packaging container or packaging bag have been used. The form of the oxygen absorber which was developed at an earlier stage and is still generally used is a sachet which is filled with a granular or powdery oxygen-absorbing component.

As an oxygen absorbent which can be handled easily, can be widely applied and will not cause problems such as eating it by mistakes, a film- or sheet-shaped (hereinafter sometimes simply referred to as "film") oxygen absorbent exists. This film-shaped oxygen absorbent is used on a packaging container or packaging bag itself. In this case, it is possible to give oxygen-absorbing performance to the packaging container or packaging bag itself.

In order to obtain a film-shaped oxygen absorbent, a technique exists to prepare a resin composition by using a thermoplastic resin as a matrix component and by fixing a granular or powdery oxygen-absorbing component in the matrix component, and to make the resin composition in a multilayered form with other resin layers.

However, the use of this oxygen-absorbing multilayered body sometimes causes the oxygen-absorbing component to contaminate the content of a container when the oxygen-absorbing layer directly contacts a packaged substance such as food, particularly when the content is liquid.

Therefore, as shown in the Japanese Patent (Kokoku) Publication No. SHO 62-1824 and the Japanese Patent (Kokoku) Publication No. SHO 63-2648, a multilayered construction has been devised, in which both sides of the oxygen-absorbing layer are covered with resin layers. For example, the absorbing surface, which is located on the packaged substance side of the oxygen-absorbing layer, is shielded with an air-permeable material and a gas-permeation-resistant layer is placed on the other side of the oxygen-absorbing layer.

If a porous air-permeable material is used for the shielding layer on the absorbing surface of the oxygen-absorbing layer, the oxygen-absorbing component leaks out toward the packaged substance which contains a large amount of moisture. Therefore, it is desirable that the shielding layer is made of a resin layer having no fear of such leakage.

A known oxygen absorber is used as the oxygen-absorbing component to be mixed in the oxygen-absorbing layer. Particularly, iron powder which is superior in the oxygen-absorbing performance is often utilized as a main element for the oxygen-absorbing reaction.

However, the oxygen absorption speed of the conventional oxygen absorbent has remained extremely low. This is because the oxygen permeability of a polyolefine-group resin used as a resin in which the oxygen-absorbing component is mixed is comparatively low, and because the oxygen permeability of the resin shielding layer which covers the absorbing surface of the oxygen-absorbing layer is also low. In other words, the oxygen-absorbing component of the oxygen-absorbing layer is blocked by the resin of the matrix component of the oxygen-absorbing layer and the resin of the shielding layer.

In order to improve the oxygen absorption speed of the oxygen-absorbing layer, as shown in the Japanese Patent Laid-Open (Kokai) Publication No. HEI 2-72851, it is known to form the oxygen-absorbing layer by drawing a resin composition sheet, which is made by mixing and kneading the oxygen-absorbing component containing iron powder as its main element in a thermoplastic resin, so that the resin composition sheet is made microporous. Moreover, the Japanese Patent Laid-Open (Kokai) Publication No. HEI 2-72851 and the Japanese Patent Laid-Open (Kokai) Publication No. HEI 5-162251 describe the technique to draw a multilayered body, in which a shielding layer of a resin composition made by mixing a barely-water-soluble filler in a thermoplastic resin is laminated over a resin composition layer containing an oxygen-absorbing component, so that the resin layer containing the oxygen-absorbing component and the shielding layer are made microporous.

In this case, drawing breaks the interface between the filler and the resin, thereby making micropores. More micropores are connected to each other, causing the entire body to become a continuously porous body. Accordingly, shielding of oxygen permeation by the resin portion decreases and, therefore, the oxygen absorption speed (air permeability) considerably improves. Although it is a porous body, if non-polar or low-polar macromolecules are used, water in a liquid state will not permeate due to the water repellency of such macromolecules.

As described above, The oxygen-absorbing film in the form where the continuously porous oxygen-absorbing layer is covered with the continuously porous shielding layer realizes a high oxygen absorption speed and may be considered as a superior oxygen absorbent which has no problem of contamination when it is used for a short period of time even if the content contains much water.

However, when any liquid having relatively low polarity (for example, when water is not used solely, but is used with an addition of various kinds of fats, oils and alcohol) exists in the content such as food, there is a problem in that the liquid permeates into the micropores of the continuously porous portion and, through the path of such a liquid phase, the oxygen-absorbing component leaks out of the oxygen-absorbing film, causing the contamination of the content.

Also in the case of water, if a gas in the micropores dissipates (for example, dissolves into a liquid) when the oxygen-absorbing body is left for a long period of time, the oxygen-absorbing component sometimes similarly leaks out. It is possible to, for example, use a fluorine-contained agent for treatment in order to give, for example, oil repellency. However, since it will bring about a new fear of contamination by the agent, it is desirable not to use it if possible.

From the viewpoint of preventing the problem of leakage of the oxygen-absorbing component toward the packaged substance, it is desirable that the shielding layer of the oxygen-absorbing layer be a resin layer which is made non-porous. However, if the resin layer becomes thick, the oxygen permeability will not be sufficient. Then, there are known examples in which a thin resin layer is used as the shielding layer. For example, the Japanese Patent Laid-Open (Kokai) Publication No. HEI 5-318675 suggests an oxygen-absorbing multilayered sheet concerning which the oxygen-absorbing resin layer which has been drawn and made microporous is coated with resin.

DISCLOSURE OF THE INVENTION

The oxygen-absorbing sheet concerning which a thin non-porous coating of the shielding layer is directly formed over the oxygen-absorbing layer has a problem of strength in that the oxygen-absorbing component of the oxygen-absorbing resin, particularly iron powder or particles, protrudes over the sheet surface or the shielding layer at the step of manufacturing the oxygen-absorbing sheet or during the handling of the oxygen-absorbing sheet. Moreover, there are fears that the oxygen-absorbing component may move from the shielding layer to the packaged substance. If a thickness of the shielding layer is then made thicker, the air permeability will be diminished, thereby resulting in lowering of the oxygen absorption performance.

It is not practically easy to form a film-shaped oxygen absorbent which is provided with substantially sufficient oxygen permeability by laminating a thin non-porous resin film over the oxygen-absorbing resin layer. Particularly, it is not easy to produce a thin film-shaped oxygen-absorbing multilayered body for a business purpose. Since the oxygen-absorbing resin layer contains a foreign substance such as iron powder, if known laminating methods such as an extrusion laminating method and a coextrusion laminating method are applied, there will be film processing problems in that iron powder may break the thin film and create pinholes or unevenness may be formed on the surface. Even if a thin non-porous coating is pasted over the oxygen-absorbing resin layer, if a pasting method is applied, it is difficult to manufacture the oxygen-absorbing multilayered body by laminating the shielding layer of a thin non-porous film.

The fact is that concerning the prior art, there is no film-shaped or sheet-shaped oxygen-absorbing multilayered body which has no fear of leakage of the oxygen-absorbing component and is superior in the oxygen absorption performance when it is used as a packaging material for a liquid substance.

An object of the present invention is to provide an oxygen absorbent in a multilayered construction and particularly in a film shape or a sheet shape, which is superior in the oxygen absorption performance and of which oxygen-absorbing component will not move or leak out toward the packaged substance. Another object of this invention is to provide an oxygen absorbent of which resin component will not leak out toward the packaged substance. A further object of this invention is to provide an oxygen absorbent of which oxygen-absorbing component will not protrude over the surface of the oxygen-absorbing multilayered body. A still further object of this invention is to provide a method for manufacturing such an oxygen absorbent.

Among the layers of the oxygen-absorbing multilayered body of this invention, a non-porous layer as a first oxygen-permeable layer, a porous layer as a second oxygen-permeable layer, and a porous oxygen-absorbing layer are formed by multilayer simultaneous drawing. Concerning a gas-permeation-resistant layer, it is possible to add such a layer either by including the gas-permeation-resistant layer in the above-described plural layers and applying the multilayer simultaneous drawing to these layers or by laminating the gas-permeation-resistant layer after the multilayer simultaneous drawing of the above-described layers. If the multilayer simultaneous drawing is conducted by including the gas-permeation-resistant layer, a resin which can be drawn and which has a low oxygen permeability may be simply laminated prior to the drawing. If the gas-permeation-resistant layer is laminated after the drawing, various methods can be utilized such as bonding or fusion of various kinds of gas-permeation-resistant films, extrusion coating of a resin having a low oxygen permeability, or vapor deposition of various kinds of substances having a low oxygen permeability.

Considering that not only the resin material which can be drawn, but also other various kinds of materials which are superior in oxygen shielding ability are used, and that an individual name (such as food name) of an object of oxygen absorption is to be printed on the gas-permeation-resistant layer side, the method of laminating the gas-permeation-resistant layer after the drawing of a plurality of layers other than the gas-permeation-resistant layer is more applicable in the manufacture and use. Since the resin which can be drawn and which has a low oxygen permeability generally contains hetero atoms, a melting temperature becomes relatively high and, therefore, it is often difficult to simultaneously draw the resin with other layers. Accordingly, it is desirable to laminate the gas-permeation-resistant layer afterward.

However, if a plurality of layers other than the gas-permeation-resistant layer are drawn and the gas-permeation-resistant layer is then laminated on the porous oxygen-absorbing layer side by some method such as bonding, fusion, extrusion coating or vapor deposition, various kinds of substances will permeate or penetrate into the micropores of the porous oxygen-absorbing layer. This lowers porosity (particularly in the case of bonding, fusion and extrusion coating). Moreover, there are problems such as lowering of porosity due to shrinkage of the micropores by heat (particularly in the case of fusion and extrusion coating), insufficient strength between the layers due to lack of contact caused by unevenness of the particles of the oxygen-absorbing component existing around the surface of the porous oxygen-absorbing layer (particularly in the case of bonding, fusion and extrusion coating), and insufficient resistance to gas permeation due to difficulty in continuous coating also because of the unevenness (particularly in the case of vapor deposition). Therefore, lowering of the oxygen absorption speed and separation of the gas-permeation-resistant layer easily tend to occur.

Accordingly, still another object of this invention is to provide a layer construction of an oxygen-absorbing film or sheet and a manufacturing method thereof in order to make the oxygen-absorbing film or sheet by drawing the layers other than the gas-permeation-resistant layer and then laminating the gas-permeation-resistant layer.

In order to achieve the above-described objects, this invention is characterized in that concerning an oxygen absorbent which comprises a multilayered body which is made of a plurality of thin resin layers laminated over one another and which is constructed in a manner such that at least one layer has the oxygen-absorbing function, a non-porous oxygen-permeable layer which is permeable to oxygen is combined with a porous oxygen-permeable layer which serves as a protection layer for the non-porous oxygen-permeable layer.

Namely, this invention is characterized in that on at least one side of the oxygen-absorbing layer which is prepared by dispersing the oxygen-absorbing component in a resin composition and making such a resin composition porous, one or more non-porous oxygen-permeable layers and one or more porous oxygen-permeable layers are combined and laminated, and the respective adjacent layers are thermally bonded to each other.

When these oxygen-permeable layers are formed on one side of the oxygen-absorbing layer, it is the oxygen absorbent of a one-side absorption type. When the oxygen-permeable layers are formed on both sides, it is the oxygen absorbent of a both-side absorption type.

It is preferable that the porous oxygen-permeable layer should comprise a thin layer of a resin composition prepared by dispersing a filler (solid) in a thermoplastic resin. It is desirable that this filler be hard to dissolve in water. Specifically, it is possible to use the fillers suggested in the aforementioned prior art.

In order to have a preferred oxygen permeability of the non-porous oxygen-permeable layer, it is desirable that the oxygen permeability of the non-porous oxygen-permeable layer be $1 \times 10^{-11}$ through $6 \times 10^{-9}$ [$cm^3/cm^2.sec.Pa$].

When the side of the multilayered body where the non-porous oxygen-permeable layer exists is dipped in n-heptane, if the amount of leakage from this multilayered body is 0.3 mg or less per 1 $cm^2$ surface area, it is possible to almost always avoid an influence on the taste, color, properties and other factors of the content.

In the case of the oxygen-absorbing multilayered body of the one-side absorption type, the gas-permeation-resistant layer is laminated on the side opposite to the oxygen-absorbing side. It is preferable that this gas-permeation-resistant layer be laminated over the oxygen-absorbing layer through the intermediary of a buffer layer.

When the oxygen-absorbing film is constructed by including the non-porous resin layer which should preferably be a non-polar or low-polar macromolecules, a desirable range of oxygen permeability required for the non-porous layer is as described below.

When a pressure difference between both sides of a film having area A is p, if it takes time t for a gas having volume V to permeate through, a gas permeability (P/X: P is a gas permeation coefficient and X is a film thickness) is (P/X)= (V)/(A.p.t). However, in this case, the pressure difference should be constant. In a definite system which is the object of this invention, it is necessary to consider that an oxygen pressure decreases as oxygen is absorbed and, therefore, the pressure difference decreases. Considering this point, changes of the oxygen concentration are not linear decreases, but are almost like exponential functional decreases. Accordingly, for example, if in the case of oxygen absorption from an object system including air (oxygen concentration: 20.6 vol %) the 0.1 vol % oxygen concentration is determined to be an oxygen-absorbed state, the permeability of about five ($\log_e (20.6/0.1)$) times as large as the value obtained by the above-mentioned expression may be sufficient. Moreover, because of the volume of air $V_a$ (V=0.206 $V_a$) and the pressure of air $p_a$ (p=0.206 $p_a$), the coefficient 0.206 is offset, thereby resulting in P/X=5$V_a$/(A.$p_a$.t). If the oxygen permeability required for the non-porous layer of the oxygen-absorbing film is calculated according to the description above, in the condition of $p_a$=1.013×10$^5$ $P_a$ (normal pressure) and with $V_a$/A=0.1–5 $cm^3/cm^2$ (most systems subject to oxygen absorption fall under this range) and t=0.5–5 days, the result is $V_a$(A.t)= 0.02–10 $cm^3/cm^2$.day and P/X=1.1×10$^{-11}$ through 5.7×10$^{-9}$ [$cm^3/cm^2.sec.Pa$]. When oxygen is absorbed from both sides, an area value should be a double of the above-mentioned area of one side.

In addition to the above-described requirements on performance, there are requirements from the manufacturing point of view as follows. Namely, considering that it is desirable to manufacture the non-porous resin layer securely on an industrial basis by using a widely used device in a manner such that no pinholes will be created, a thickness of the non-porous layer should be about 3 $\mu$m at minimum, preferably 10 $\mu$m or more, or may be about 15 $\mu$m or more when the non-porous layer is made a part of the multilayered construction.

Assuming that this non-porous layer is constructed by using polypropylene which is a typical non-polar macromolecules, in the condition of oxygen permeation coefficient P=1.7×10$^{-13}$ [$cm^3.cm/cm^2.sec.Pa$] (30° C.) (Polymer Handbook, 2nd Ed. III-235, J. Brandrup and E. H. Immergut, John Willy & Sons (1975), the units are converted) and with thickness X>10 $\mu$m, it is applicable if P/X is within the range of P/X<1.7×10$^{-10}$ [$cm^3/cm^2.sec.Pa$]. In order to use polypropylene as a typical object in the case of $V_a$/A=1 $cm^3/cm^2$ and t=1 day, thinness of thickness X=3 $\mu$m is necessary according to the same calculation.

Moreover, assuming that the non-porous layer is constructed by using polymethylpentene as a resin having a higher oxygen permeation coefficient than that of polypropylene, in the condition of oxygen permeation coefficient P=2.4×10$^{-12}$ [$cm^3.cm/cm^2.sec.Pa$] (25° C.) (Polymer Handbook, 2nd Ed. III-235) and with thickness X>10 $\mu$m, it is applicable if P/X is within the range of P/X<2.4×10$^{-9}$ [$cm^3/cm^2.sec.Pa$]. Even in the case of $V_a$/A=1 $cm^3/cm^2$ and t=1 day, thickness is X=42 $\mu$m.

As described above, as for the oxygen permeability of the non-porous layer for the shielding purpose, it is possible to almost satisfy the required performance if an appropriate resin is properly selected.

On the other hand, since the oxygen permeability improves if the oxygen-absorbing layer is made continuously porous, it is not particularly necessary to limit the oxygen permeability of the resin which serves as a matrix component regarding the oxygen-absorbing layer. It is also possible to use a widely used resin such as polypropylene at a comparatively low price. Accordingly, if the resin used for the non-porous layer is different from the resin used for the matrix component of the oxygen-absorbing layer, it is necessary that both these layers can be easily made multilayered.

Since this invention utilizes a granular or powder-form oxygen-absorbing component, if the oxygen absorbent is constructed in a manner such that only the non-porous layer exists between the content and the continuously porous oxygen-absorbing layer, there is a possibility that the non-porous layer may be damaged by the oxygen-absorbing component. Therefore, it is necessary to apply some protection over the non-porous layer and it is necessary to minimize the lowering of the oxygen permeability caused by such a protection portion.

Next, construction examples of the oxygen-absorbing multilayered film of the one-side absorption type and the both-side absorption type according to this invention are hereinafter described by referring to the drawings. As the oxygen-absorbing film of the one-side absorption type, FIG. 1 shows the construction of the non-porous layer (first oxygen-permeable layer), porous layer (second oxygen-permeable layer), porous oxygen-absorbing layer, and gas-permeation-resistant layer (C/B/A/D), FIG. 2 shows the construction of the porous layer, non-porous layer, porous oxygen-absorbing layer and gas-permeation-resistant layer (B/C/A/D), and FIG. 3 shows the construction of the non-porous layer, porous layer, porous oxygen-absorbing layer, buffer layer, adhesive layer and gas-permeation-resistant layer (C/B/A/E/F/D). As other constructions, C/B/C/A/D and C/B/A/E/D are also possible.

As the oxygen-absorbing film of the both-side absorption type, FIG. 4 shows the construction of the non-porous layer, porous layer, porous oxygen-absorbing layer, porous layer and non-porous layer (C/B/A/B/C). As other constructions, B/C/A/C/B and C/B/C/A/C/B/C are also possible.

As explanation of a method for manufacturing these oxygen-absorbing films with reference to the construction of FIG. 3, the laminated body which is constructed with layer A, layer B, layer C and the buffer layer (layer E) which is made into a thin layer is drawn by the method of this invention and then layer D is laminated through the intermediary of the adhesive layer (layer F). Accordingly, not only a resin material, but also various kinds of materials which are superior in resistance to gas permeation can be used for layer D.

As the resin to construct the non-porous layer in this invention, an appropriate resin should be selected among those which are non-polar or low-polar macromolecules and which have an appropriate oxygen permeation coefficient P in correspondence to the required performance of the object of oxygen absorption (or the content) as represented by the aforementioned oxygen permeability P/X. If the required performance is low, there is no special limitation. However, in order to correspond to a wider requirement range, it is desirable that P should be $1 \times 10^{-13}$ [cm$^3$.cm/cm$^2$.sec.Pa] or more, preferably $1 \times 10^{-12}$ [cm$^3$.cm/cm$^2$.sec.Pa] or more if possible.

The resin to construct the non-porous layer may be not only macromolecules polymerized from a single monomer, but also various kinds of copolymers and resin mixtures as long as it is non-porous. Moreover, as long as the oxygen permeability of the entire non-porous layer satisfies the aforementioned range, the non-porous layer itself may be constructed with a plurality of layers. When the same resin as that used for the non-porous layer is used as the resin which serves as the matrix component of other layers, there is no special limitation. However, if a different resin is used, affinity between the resin and the resin to construct the non-porous layer is important. Namely, as is related to a laminating method to be described later, particularly when no adhesive agent is used, it is desirable that the resin of the non-porous layer and the resin to be used as the matrix component of other layers should have characteristics of compatibility to each other. The confirmation of "compatibility" herein referred to should not necessarily be strict in terms of thermodynamics. For example, if heat sealing of both resins is possible, the compatibility may be affirmed.

Specific examples of resins are homopolymers and copolymers of olefine group such as ethylene, propylene, 1-butene or 4-methyl-1-pentene, ethylene-vinyl-acetate-copolymers, polybutadiene, polyisoprene, styrene-butadiene-copolymers and hydrogenated form thereof, and various kinds of silicon resins. Moreover, any modified form, graft form or mixture of the above-listed resins may also be used. A maximum value of thickness of the non-porous layer is determined by the required performance of the object of oxygen absorption as represented by the oxygen permeability and by the oxygen permeation coefficient of the resin. However, if it is possible to manufacture the non-porous layer securely without creating pinholes and if it is certain that neither pinholes nor breakage will be caused by a contact with the content during a normal use, it is desirable that the non-porous layer be thinner than the maximum value as much as possible. In general, it is desirable that thickness of the non-porous layer be about 5–20 μm.

The expression "non-porous" herein means that the resin does not contain any solid such as filler or oxygen-absorbing component and, for example, will not be made porous even if it is drawn.

On the other hand, the continuously porous construction which is formed in the oxygen-absorbing layer and the porous layer secures the air permeability which is necessary for oxygen to reach the oxygen-absorbing component. Specifically speaking, it is desirable that the pores are connected to each other and a fraction of volume density of the pores to the entire layer is 0.1 or more. From the viewpoint of strength of the layer, it is desirable that the upper limit of such ratio be 0.9 or less, more preferably 0.5 or less.

There is no special limitation as to the position and number of the non-porous layer in the multilayered construction as long as it is located between the content subject to oxygen absorption and the oxygen-absorbing layer. The position and number of the non-porous layer are selected as appropriate in accordance with the use, purpose, productivity and other factors. However, considering that manufacture can be simplified by making the total number of the layers as small as possible, the position of the non-porous layer should be between the oxygen-absorbing layer and the continuously porous layer containing the barely-water-soluble filler or should be on the content side of the continuously porous layer containing the barely-water-soluble filler, that is, an outermost layer.

If the non-porous layer is located between the oxygen-absorbing layer and the continuously porous layer containing the barely-water-soluble filler, the continuously porous layer containing the barely-water-soluble filler acts to protect the non-porous layer against any force from outside. If the non-porous layer is located on the content side of the continuously porous layer containing the barely-water-soluble filler, the continuously porous layer containing the barely-water-soluble filler acts to reinforce the non-porous layer.

Of the above-described constructions, the construction in which the porous layer is located on the content side does not deform so much in a direction of thickness of the non-porous layer at the time of drawing and, therefore, breakage of the non-porous layer does not occur so often. Moreover, the above construction is superior in that after the drawing the non-porous layer is protected against any impact given by the content. On the other hand, the construction in which the non-porous layer is located on the content side is superior in that even if it contacts with a low-polar liquid, the liquid will not permeate into the inside of the multilayered body and, therefore, the oxygen absorption performance will not lower due to permeation of the liquid. An appropriate layer construction should be selected by taking the above-described advantages and disadvantages into consideration.

Various compositions are known as the oxygen-absorbing component to be used for the oxygen-absorbing layer. Among such compositions, metal powder such as iron powder, aluminum powder and silicon powder, inorganic salts such as ferrous salt, ascorbic acid and salts thereof, alcohols or phenols such as catechol and glycerol are preferred. Particularly, those containing iron powder as a main component are appropriate. Moveover, those with iron powder and various kinds of salts, particularly metal halide, added therein are preferred. The most preferred composition is iron powder of which surface is coated with metal halide.

As for the grain size of the oxygen-absorbing component such as iron powder, there is no special limitation as to a grain diameter distribution as long as a maximum grain diameter is less than the thickness of the oxygen-absorbing layer described later. However, considering the oxidation speed and no damage to (no piercing through) other layers, finer grains are preferred. However, if the grains are too fine, there is a danger of dust explosion and, therefore, careful handling is required. Such fine grains are also expensive in general. Therefore, a median diameter on a weight basis should be 10–100 $\mu$m, and more preferably about 30–50 $\mu$m.

When an addition ratio of the oxygen-absorbing component to the oxygen-absorbing layer is too low, it is difficult to make the layer porous. When the addition ratio is too high, it is difficult to make the layer into a film or sheet shape. Accordingly, the addition ratio should be set by such a volume fraction that a continuously porous film will be obtained by drawing. Such a volume fraction is generally within the range of 10–60 vol %, or more preferably 20–40 vol %. If the addition ratio is expressed by a weight percentage, a range of various values is available depending on the density of the oxygen-absorbing component. Particularly, in the case of iron powder, since it has a high density, the addition ratio by weight percentage is 40–90 wt %, or more preferably about 60–85 wt %. If the amount of iron powder is reduced, it is possible to similarly make the layer continuously porous by adding another filler.

Concerning the filler to be used for the continuously porous layer containing the barely-water-soluble filler, there is no special limitation as long as it is an inorganic or organic substance which is insoluble or hardly soluble in water. Assuming that the oxygen-absorbing film can be used also with the content which is, for example, an acid liquid, if the non-porous layer is not located on the content side, it is necessary that the oxygen-absorbing component will not leak out in the above-described condition. Moreover, a filler such as an oxide being in almost no danger of burning is desirable.

Because of the reasons described above, as examples of an inorganic filler, silica, diatomaceus earth, talc, titania and barium sulfate are appropriate. As examples of an organic filler, resin particles having a higher melting point than that of the matrix resin, and cellulose powder are appropriate. As for the grain diameter of the filler, there is no special limitation as long as it is within the range which allows easy handling including the addition to the resin. From the viewpoint of not damaging the other layers and protecting the non-porous layer as the continuously porous layer, it is desirable that the grain diameter be less than the thickness of the non-porous layer and even finer particles are desirable. A 10 $\mu$m or less maximum grain diameter is preferred.

As for the resin to be used for the oxygen-absorbing layer and the continuously porous layer containing the barely-water-soluble filler, since both layers are made continuously porous later, the oxygen permeability of the resin itself does not especially matter and there is no special limitation as long as the resin allows the oxygen-absorbing component such as iron powder or the barely-water-soluble filler to be easily mixed or dispersed in it. The resin should be selected by considering a good compatibility with the non-porous layer, easiness of drawing, and a working temperature range of the oxygen-absorbing multilayered film. In general, the above-mentioned examples of resins for the non-porous layer apply correspondingly.

Thickness of the oxygen-absorbing layer is determined generally by a total oxygen absorption amount. Namely, the thickness containing the oxygen-absorbing component in a minimum amount which is capable of absorbing the entire oxygen in the air which is subject to oxygen absorption is the minimum thickness. Since the oxygen-absorbing component in the amount twice or three times as much as the minimum amount is usually used by considering a possibility of slow inflow of oxygen during long-term preservation of the content, the thickness is basically twice or three times as much as the minimum thickness. In addition, when the oxygen-absorbing layer is made continuously porous, even the oxygen-absorbing component inside the oxygen-absorbing layer will be directly involved in the oxygen absorption as compared with the case where the oxygen-absorbing layer is not made porous. Accordingly, an absorption speed at the beginning increases generally in proportion to the thickness. Therefore, the thickness is determined also by considering the oxygen absorption speed. On the other hand, since the oxygen permeation of the non-porous layer becomes rate-determing slow, the absorption speed becomes a maximum value when the permeation speed of the non-porous layer becomes equal to the absorption speed of the oxygen-absorbing layer. A preferred thickness of the oxygen-absorbing layer is, for example, 30 $\mu$m through 200 $\mu$m.

The continuously porous layer containing the barely-water-soluble filler needs to have such thickness as will allow protection or reinforcement of the non-porous layer against outside force, and prevention of damage (such as breakage caused by large iron powder) given by the particles of the oxygen-absorbing component to the non-porous layer. It is desirable that the thickness of the continuously porous layer be about a half or more of the maximum grain diameter of the oxygen-absorbing component. On the other hand, if it is unnecessarily too thick, the entire oxygen-absorbing film becomes too thick. Therefore, a maximum value of thickness of this layer is about ten times as long as the maximum grain diameter of the particles of the oxygen-absorbing component.

As materials to compose the gas-permeation-resistant layer having a low oxygen permeability, there are commonly known materials as follows: as for resins having a low oxygen permeability, a polyester group such as polyethylene terephthalate, a polyamide group such as nylon 6 and nylon MXD, resins containing chloride such as polyvinyl chloride and polyvinylidene chloride, ethylene-vinyl-alcohol-copolymer, and coated materials thereof; as for metals, foil or vapor deposited metal such as aluminum; and among inorganic compounds, laminated materials such as vapor deposited silicon oxide on resin. According to the properties of these materials, they are either previously made in a multilayered form with other layers and then are drawn, or are bonded or fused to or directly evaporated on other layers which have been drawn, thereby producing a final multilayered construction.

In the case of bonding or fusion to other layers, an adhesive layer or fusion layer may be added as necessary. If the gas-permeation-resistant layer is directly bonded or fused to the oxygen-absorbing layer which has been made porous, an adhesive agent or a melted resin for fusion penetrates into the continuous pores and the oxygen permeability sometimes lowers. When iron powder is used as the oxygen-absorbing component, there is a fear that the bonding might become difficult due to unevenness of the oxygen-absorbing layer as compared with a general film or sheet in which a resin is solely used. As a means of avoiding these problems, it is desirable that a buffer layer which contains as a main component the same resin as that used as the matrix component of the oxygen-absorbing layer or a resin having compatibility with such a resin, and which is to protect the continuous pores and to flatten the surface should be previously laminated over the external side of the oxygen-absorbing layer, and that the layers including the buffer layer be drawn and then the gas-permeation-resistant layer having a low oxygen permeability be bonded or fused to the layers.

As described above, it is necessary that this buffer layer have the function to reduce or remove an influence of the micropores and an influence of the uneven surface of the porous oxygen-absorbing layer. Accordingly, it is necessary that a thickness of the buffer layer after drawing become no less than a minimum thickness which allows to exhibit the above-described function. This minimum thickness generally depends on the grain diameter of the oxygen-absorbing component and a distribution thereof. As a criterion, about a half or more of the median diameter on a weight basis is desirable. On the other hand, there is no special limitation when the buffer layer is made thicker. However, considering only the point that it is necessary to satisfy the above-described function, a maximum thickness would be about five times as long as the maximum grain diameter of the oxygen-absorbing component particle. Moreover, since it is necessary that the buffer layer continue to be laminated over the porous oxygen-absorbing layer in a closely adhered manner before and after the drawing, it is preferable that the resin to compose the buffer layer be compatible with the resin of the porous oxygen-absorbing layer. Since the buffer layer is located on the gas-permeation-resistant layer side of the oxygen-absorbing layer, the oxygen permeability of the buffer layer does not particularly matter. As for a thickness of the buffer layer, 20–200 $\mu$m after the drawing is preferred. It should be noted that the descriptions about thickness of layers hereinabove mentioned refer to thickness after the drawing.

Methods for laminating the gas-permeation-resistant layer over the buffer layer can be mainly classified into the case where the adhesive layer is required and the case where the adhesive layer is not required. In the case where the adhesive layer is required, there are, for example, a bonding method by using an adhesive agent and a thermal bond or extrusion laminating method by using an adhesive resin. In the case where the adhesive layer is not required, there are, for example, a method of using an adhesive resin for the buffer layer itself and a vapor deposition method.

As for a gas-permeation-resistant film to be used for lamination, not only a single layer film, but also multilayered film made by, for example, coextrusion, extrusion laminating, extrusion coating or vapor deposition can be used. When a compatibility between the resin used for the buffer layer and various materials used for the gas-permeation-resistant layer is low, a surface treatment may be conducted on at least one layer in order to make surface energy values of these layers closer to each other. It is normally desirable that the surface treatment be conducted on the buffer layer to activate the surface of the buffer layer.

As the surface treatment of the buffer layer, various kinds of commonly known chemical treatments or physical treatments can be applied. As for the chemical treatments, there are those which utilize, for example, acid, alkali, oxidizing agents, or various kinds of reactive gases. As for the physical treatments, there are those which utilize, for example, flame, ultraviolet rays or plasma. Of these treatments, an appropriate treatment is selected and applied in accordance with a combination of the materials of the buffer layer and the materials of the gas-permeation-resistant layer.

Because the oxygen-absorbing film or sheet of this invention includes a porous portion and a liquid might penetrate from the edges of the film or sheet, which are not covered with the buffer layer, the physical treatments are superior to the other treatments in that the physical treatments can be conducted in a dry condition. Among these treatments, an ultraviolet ray treatment and a corona discharge treatment which is one type of a plasma treatment are especially superior because such treatments can be conducted simply by supplying energy (although a small amount of oxygen in the air is used at the same time). When a thickness of the buffer layer is small, for example, about a half of the median diameter of the oxygen-absorbing component, there will be almost no influence on the micropores of the porous oxygen-absorbing layer. However, since the influence of the uneven surface of the buffer layer is not completely extinguished, treatment conditions become severe as compared with a normal film having a flat surface.

When the oxygen-absorbing film of this invention is used for oxygen absorption from a system containing various kinds of liquids, it is preferable that the oxygen-absorbing film be resistant to such liquids. When non-polar or low-polar macromolecules or their mixtures are mainly used as resins to compose the respective layers, the oxygen-absorbing film is generally resistant to high-polar solvents, such as water and alcohol, and acid or alkali aqueous solutions.

However, some of these macromolecules or their mixtures are partly or completely dissolved by various kinds of oils or low-polar organic solvents. For the use which requires resistance to such various kinds of oils and low-polar organic solvents (hereinafter referred to as "oil resistance"), it is desirable that the type of resin be further selected. This selection is possible, for example, by measuring a dissolution amount of the resin in one or more kinds of representative solvents. If the dissolution amount is lower than a predetermined value, the resin can be used for an oil resistance use. Preferred examples of the resin having such oil resistance are homopolymers and/or copolymers of olefine such as ethylene, propylene, 1-butene and 4-methyl-1-pentene, and hydrogenated styrene-butadiene-copolymer.

As for the dissolution amount in the case where various kinds of films are used, for example, for a packaging container of food, there are general standards which should be achieved. The standards in Japan are shown in the "Standards for Food and Additives" (Notification No. 370 by the Ministry of Health and Welfare in 1959), Chapter "III. Appliances and Container Packages," Section "D. Appliances or Container Packages or Standards for Different Materials Therefor," Item "2. Appliances or Container Packages Made of Synthetic Resin," which are based on the "Food Sanitation Law." According to the standards, the oil resistance is determined by an amount of evaporation residues in n-heptane (as represented by a weight ratio of the evaporation residues to the weight of n-heptane after leakage) when 2 $cm^3$ n-heptane is used per 1 $cm^2$ surface area of a film and the film is dipped in n-heptane for one hour at a temperature of 25° C. However, since the leakage is observed during a finite time, the dissolution amount is not generally an equilibrium value. If this amount is no more than the standard value, the film can be used for a packaging container. The standard value is decided for each resin type. Examples of high standard values are 240 ppm for polystyrene and 150 ppm for polyethylene and polypropylene. By using a 0.68 g/cm$^3$ density of n-heptane, a leakage weight per 1 cm$^2$ surface area of the film can be found as about 0.3 mg in the case of 240 ppm as mentioned above.

As described above, if the oil resistance is required for the oxygen-absorbing film, an appropriate resin type should be selected according to the above-described standards. Generally speaking, when a compatibility between the resin and the solvent is low, leakage occurs from only around the surface of the film. When the compatibility is high, the solvent penetrates into the inside of the film layers and, therefore, leakage occurs also from the inside. Namely, the amount of leakage in the case of a high compatibility is influenced by not only a surface area of the film, but also a thickness of the film. Accordingly, when the oil resistance of the oxygen-absorbing film is measured, the film with a fixed thickness, in other words, the film which has been made completely multilayered is used. Moreover, since measurement is conducted only on the side in contact with the content, the oxygen-absorbing side(s) of the oxygen-absorbing film (one side with the non-porous layer and the porous layer disposed thereon in the case of the one-side absorption type, and similarly both sides in the case of the both-side absorption type) is/are the measurement portion (s).

The oxygen-absorbing film and sheet of this invention can be used in various forms as the oxygen-absorbing packaging materials, for example, on a part or whole of a packaging bag or packaging container. As the content to be placed in the packaging bag or packaging container, not only solids, but also liquids or both solids and liquids are possible.

As materials to compose each layer, it is possible to add various kinds of substances other than the aforementioned materials as long as a high oxygen absorption speed of the oxygen-absorbing film and the prevention of leakage of the oxygen-absorbing component and resin can be maintained and there is no additional problem such as new leakage. As such additives, for example, there are pigments or dyestuff for coloring or concealment, stabilizing components for oxidation prevention or decomposition prevention, electrification preventing components, moisture-absorbing components, deodorizing components, plasticizing components and flame retardant components. Similarly, it is possible to add other layers such as a print layer, easily openable layer or easily peelable layer as long as such additional layers will not have a bad influence on the performance of the oxygen-absorbing film.

The essential point in manufacturing this invention is to laminate multiple layers and then simultaneously draw the laminated multiple layers together. This method makes it possible to effectively make the oxygen-absorbing layer and the layer containing the barely-water-soluble filler continuously porous and to enhance the oxygen permeability. At the same time, this method makes it possible to make the non-porous layer stably thin. By the method of drawing each layer and then laminating them over one another (including the case where a ready-made porous film of a single layer is used), bonding or fusion is necessary at the time of lamination. The bonding or fusion may fill up not a few continuous pores and may lower the oxygen permeability after the lamination, and also it is difficult to manufacture, bond or fuse a thin non-porous layer.

Upon the lamination of multiple layers, it is possible to adopt normal methods such as coextrusion, extrusion coating and extrusion laminating. The multilayered construction corresponding to this invention can be obtained by any of these methods. Of these methods, particularly preferred methods are the extrusion coating and the extrusion laminating, by which the layers are laminated one by one. Since a flat film (which has no problem in strength because it is thick especially before the drawing) is once formed and then a next layer is laminated on it, for example, even when iron powder is used as the oxygen-absorbing component, other layers are hardly influenced by unevenness of the iron powder. On the other hand, the coextrusion achieves high productivity.

As generally known concerning the drawing, any of the following methods may be used: uniaxial drawing, biaxial simultaneous drawing or biaxial successive drawing. Since it is necessary that the oxygen-absorbing layer and the layer containing the barely-water-soluble filler be made continuously porous in order to achieve a high oxygen permeability and the non-porous layer be made in a thin film form without any breakage, it is desirable that a drawing temperature be about or lower than the melting temperature of the resin of the non-porous layer and a drawing multiplying factor be twice through twenty times on an area conversion basis. When the above-described drawing is conducted, a thickness of the multilayered body after the drawing can be found as follows:

(Thickness before Drawing/Effective Area Multiplying Factor)×(1/(1—Volume Fraction of Pores))

When the gas-permeation-resistant layer having a low oxygen permeability is added afterward, it is possible to bond or fuse such a layer by a normal method such as heat lamination, dry lamination or extrusion coating, thereby producing a final multilayered construction. A low oxygen permeability means that the oxygen permeation coefficient is, for example, 1×10$^{-15}$ (cm$^3$.cm/cm$^2$.sec.Pa) or less.

The oxygen-absorbing film of this invention can be used as the oxygen-absorbing packaging material on a part or whole of a packaging bag or packaging container. FIG. 5 shows an example where an oxygen-absorbing film 10 of the one-side absorption type is used as a top seal film of a packaging container 40. FIG. 6 shows an example where the oxygen-absorbing film 10 is used for a packaging bag 50. Reference numeral 30 corresponds to a packaged substance or content which may be fixation liquid, or both solid and liquid.

FIGS. 7 and 8 show examples where an oxygen-absorbing film 20 of the both-side absorption type is placed within a packaging bag 50 as an inside bag or partition for packaging. In the example of FIG. 8, the oxygen-absorbing film is partly molded and its edges are thermally bonded.

BEST MODE FOR CARRYING OUT THE INVENTION

Figure 1:
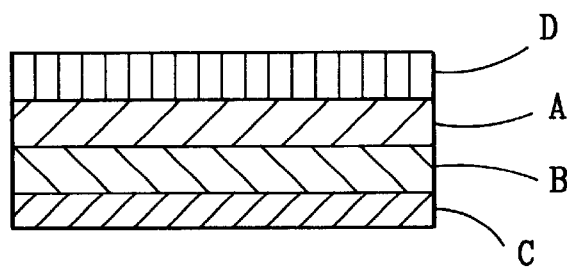
FIG. 1 shows a cross section of a construction example of the oxygen-absorbing multilayered film of a one-side absorption type (when the non-porous oxygen-permeable layer is made an outermost layer).
Figure 2:
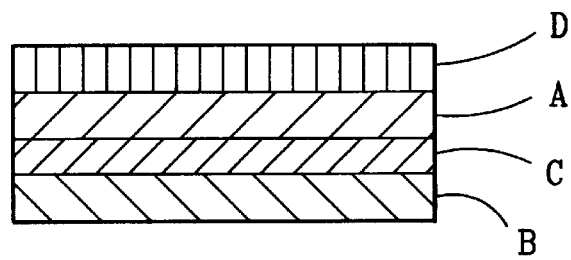
FIG. 2 shows a cross section of a construction example of the oxygen-absorbing multilayered film of the one-side absorption type (when the non-porous oxygen-permeable layer exists between the continuously porous layer and the continuously porous oxygen-absorbing layer).
Figure 3:
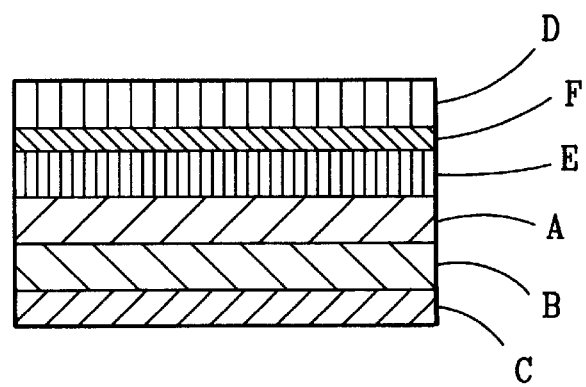
FIG. 3 shows a cross section of a construction example of the oxygen-absorbing multilayered film of the one-side absorption type (when the non-porous oxygen-permeable layer is made an outermost layer and the gas-permeation-resistant film is bonded later).
Figure 4:
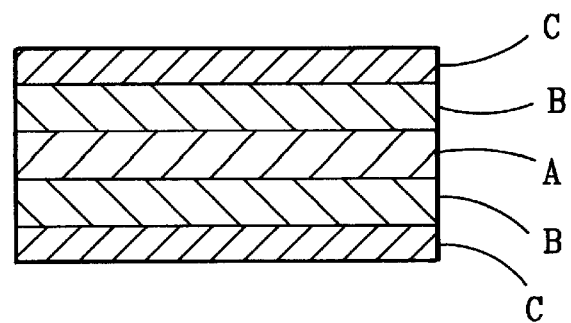
FIG. 4 shows a cross section of a construction example of the oxygen-absorbing multilayered film of a both-side absorption type (when both outermost layers are the non-porous oxygen-permeable layers).
Figure 5:
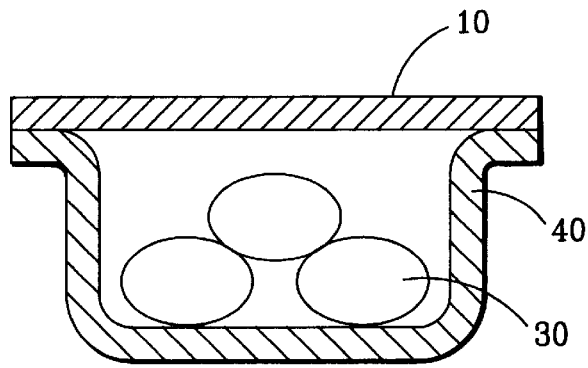
FIG. 5 shows a cross section of a packaging container for which the oxygen-absorbing multilayered film of the one-side absorption type is used as a top seal film.
Figure 6:
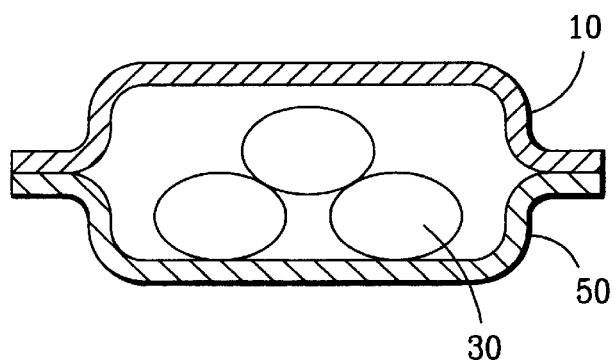
FIG. 6 shows a cross section of a packaging bag for which the oxygen-absorbing multilayered film of the one-side absorption type is used on one side.
Figure 7:
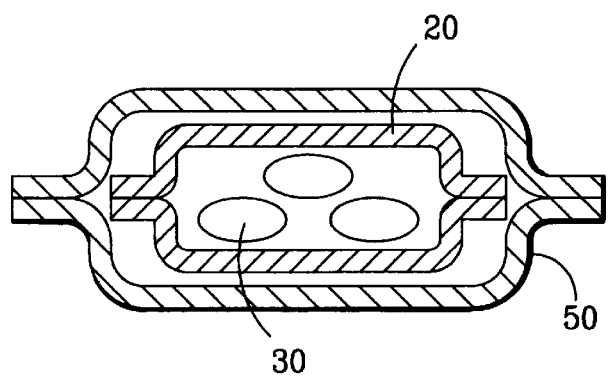
FIG. 7 shows a cross section of a packaging bag for which the oxygen-absorbing multilayered film of the both-side absorption type is used as an inside bag.
Figure 8:
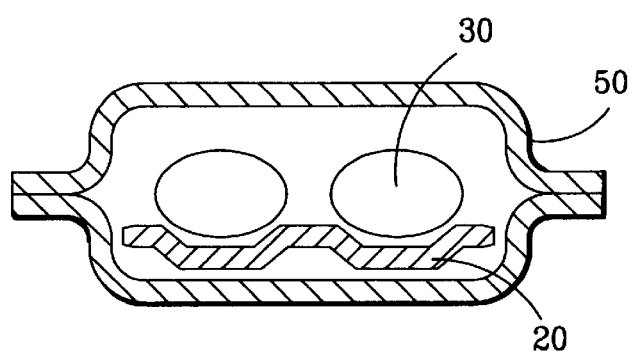
FIG. 8 shows a cross section of a packaging bag for which the oxygen-absorbing multilayered film of the both-side absorption type is used as a partition.

The present invention is hereinafter explained in more detail by referring to Examples and Comparative Examples. However, this invention is not limited by such explanations. Common items in the explanations are as follows:

As the oxygen-absorbing component, iron powder having an about 35 μm median diameter (maximum grain diameter: about 100 μm) was used, to which coating was applied by spraying a calcium chloride aqueous solution over the iron powder and then heating and drying the iron powder. A ratio was 2 parts by weight calcium chloride to 100 parts by weight iron powder (such iron powder will be hereinafter simply referred to as "iron powder"). A mixture of 70 wt % iron powder and 30 wt % resin was used as a material of the oxygen-absorbing layer.

As the barely-water-soluble filler, synthetic silica (CRYSTALITE VXS2 made by Tatsumori Ltd.; median diameter: 5 μm) and diatomaceous earth (RADIOLITE F made by Showa Chemical Industry Co., Ltd.; median diameter: 7 μm) were used. A mixture of 50 wt % synthetic silica and 50 wt % various kinds of resins or a mixture of 40 wt % diatomaceous earth and 60 wt % various kinds of resins was used as materials for the layer containing the barely-water-soluble filler, which is the layer at the stage before the porous layer. However, unless otherwise indicated, the former mixture was used in Examples described below.

Resin components used for the respective layers and their properties are as follows:

Polypropylene (FX4D): made by Mitsubishi Chemical Corp. A product name is polypropylene, but is actually a copolymer containing a little amount of other α-olefin. A melt flow rate is 6.0 g/10 min., a melting point is 140° C., and an oxygen permeation coefficient at a temperature of 25° C. is $1.4 \times 10^{-13}$ [cm$^3$.cm/cm$^2$.sec.Pa].

Linear Low-Density Polyethylene (ULTZEX 2520F): made by Mitsui Petrochemical Industries, Ltd. A product name is polyethylene, but is actually a copolymer containing a little amount of other α-olefin. A melt flow rate is 2.3 g/10 min., a melting point is 118° C., and an oxygen permeation coefficient at a temperature of 25° C. is $3.0 \times 10^{-13}$ [cm$^3$.cm/cm$^2$.sec.Pa].

4-Methyl-1-Pentene-Copolymer (TPX MX002): made by Mitsui Petrochemical Industries, Ltd. A melt flow rate is 22 g/10 min. (260° C.), a melting point is 235° C., and an oxygen permeation coefficient at a temperature of 25° C. is $2.4 \times 10^{-12}$ [cm$^3$cm/cm$^2$.sec.Pa].

Ethylene-Propylene-Copolymer (TAFMER S-4030): made by Mitsui Petrochemical Industries, Ltd. A molar fraction of the ethylene component is about 0.5. A melt flow rate is 0.2 g/10 min. (190° C.). An oxygen permeation coefficient of this sole copolymer is unknown. An oxygen permeation coefficient of a mixture with 50 wt % polypropylene (FX4D) at a temperature of 25° C. is $3.0 \times 10^{-13}$ [cm$^3$.cm/cm$^2$.sec.Pa].

Ethylene-Propylene-Copolymer (TAFMER P-0680): made by Mitsui Petrochemical Industries, Ltd. A molar fraction of the ethylene component is about 0.75. A melt flow rate is 0.4 g/10 min. (190° C.). An oxygen permeation coefficient at a temperature of 25° C. is $1.4 \times 10^{-12}$ [cm$^3$.cm/cm$^2$.sec.Pa]. An oxygen permeation coefficient of a mixture with 30 wt % linear low-density polyethylene (ULTZEX 2520F) at a temperature of 25° C. is $8.2 \times 10^{-13}$ [cm$^3$.cm/cm$^2$.sec.Pa].

Mixture of Hydrogenated-Styrene-Butadiene-Copolymer and Polypropylene (DYNARON H4800N): made by Japan Synthetic Rubber Co., Ltd. A weight percentage of polypropylene is 30 wt %. A melt flow rate is 16 g/10 min. (230° C.).

Ethylene-Vinyl-Acetate Copolymer (LV360): made by Mitsubishi Chemical Corp. A weight percentage of vinyl acetate is 10 wt %. A melt flow rate is 9.0 g/10 min. A melting point is 95° C.

Adhesive Polyolefine (ADMER NF300): made by Mitsui Petrochemical Industries, Ltd. A melt flow rate is 1.3 g/10 min. (190° C.). A melting point is 120° C.

Adhesive Polyolefine (ADMER NF550): made by Mitsui Petrochemical Industries, Ltd. A melt flow rate is 6.2 g/10 min. (190° C.). A melting point is 120° C.

Nylon MXD (MX-NYLON 6007): made by MITSUBISHI GAS CHEMICAL CO., INC. A melt flow rate is 2.0 g/10 min. A melting point is 240° C.

Ethylene-Vinyl-Alcohol-Copolymer (EVAL EP-E105): made by KURARAY CO., LTD. A molar fraction of the ethylene component is 0.44. A melt flow rate is 5.5 g/10 min. (190° C.). A melting point is 165° C.

As the oxygen-permeation-resistant film, a nylon film (SUPERNYL made by Mitsubishi Chemical Corp.) which is 15 μm thick or a lamination film of nylon and polypropylene (which includes a thin adhesive layer between the SUPERNYL nylon layer and the polypropylene layer, which is 65 μm thick in total, and which is made by Mitsubishi Chemical Corp.) was used, and an adhesive agent for dry lamination (AD-585 and CAT-10 made by Toyo Morton Ltd.) was used for bonding of the film.

In mixing of iron powder which is the oxygen-absorbing component and the resin or in mixing of the barely-water-soluble filler and the resin, dry blend of these materials was conducted at a predetermined weight ratio and the blended materials were then heated, melted and kneaded by using a biaxial extrusion machine (screw diameter: 30 mm). The mixture was extruded from a strand die, was cooled and then was cut by a pelletizer, thereby obtaining mixture pellets.

The oxygen absorption performance was measured by placing the oxygen-absorbing multilayered film having a predetermined area, a predetermined amount of air and an absorbent cotton containing water for humidification in an oxygen-permeation-resistant bag which contains an aluminum layer, and by tracing changes of an oxygen concentration according to elapsed time at a temperature of 25° C. by a gas chromatograph (GC-14B made by Shimazu Corp.). As a sample for measurement, a film cut in a size of 15 cm×20 cm was used and its edges were covered with a synthetic-rubber-type adhesive agent so that oxygen would not be absorbed from the edges. The amount of air was determined as 300 cm$^3$ and a period of time required to reach the 0.1 vol % oxygen concentration was measured, which was considered as an oxygen absorption time.

Evaluation of contamination by the iron powder which is the oxygen-absorbing component was conducted by dipping the film having a predetermined area in a 0.01N hydrochloric acid aqueous solution and by tracing changes of an amount of iron leakage in the solution according to elapsed time at a temperature of 25° C. by using a plasma spectrophotometer (SPS1200VR made by Seiko Instruments Inc.).

As preparation of the evaluation, the edges of the film were first covered with a synthetic-rubber-type adhesive agent, and the film was then left in the air at a temperature of 60° C. and at 80% relative humidity for about five days to oxidize the iron powder in the resin, thereby obtaining the film as a sample for measurement. In a case of the construction where the continuously porous layer containing the barely-water-soluble filler is placed at the surface position of the film, not only the film was directly in an hydrochloric acid aqueous solution, but also the water repellency of the film was previously diminished by ethanol and the film was then dipped in the hydrochloric acid aqueous solution. At that time, the hydrochloric acid aqueous solution was prepared with a hydrochloric acid of atomic absorption analysis grade and pure water having an electric conductivity of less than 0.07 $\mu$S/cm and was used by placing it in a container made of polyethylene with a lid.

An allowable concentration of iron was set as follows: When a concentration which may give an influence on taste by using a ferric chloride aqueous solution was examined, some changes were observed at about 10 ppm. Therefore, an upper limit was set as 3 ppm as the value corresponding to iron excluding chloride. Even if the area of the oxygen-absorbing film which is a leakage source is the same, this concentration changes depending on a liquid amount at a place toward which leakage occurs. The less the liquid amount is, the higher the concentration is. The film in a size of 15 cm×20 cm was dipped in a 1000 cm$^3$ hydrochloric acid aqueous solution, thereby the leakage concentration was measured.

Evaluation of oil resistance was conducted in accordance with the method indicated in the "Standards for Food and Additives" (Notification No. 370 by the Ministry of Health and Welfare in 1959), Chapter "III. Appliances and Container Packages," Section "B. Testing Method for Appliances or Container Packages in General," Item "4. Testing Method for Evaporation Residues." That is to conduct a weight measurement of the amount of evaporation residues in n-heptane which has been used by having n-heptane in the amount of 2 cm$^3$ per 1 cm$^2$ surface area of the oxygen-absorbing film contact the oxygen-absorbing film on the oxygen-absorbing surface side for one hour at a temperature of 25° C. Then the weight of a blank test obtained by causing n-heptane which has not contacted the film to evaporate is subtracted from the weight obtained by the above weight measurement, and the weight as a result of the subtraction is then divided by the surface area, thereby obtaining the leakage amount per 1 cm$^2$ surface area. This value is compared with the aforementioned standard value 0.3 mg to determine the oil resistance. For the use which does not need the oil resistance, the multilayered film can be used regardless of this evaluation.

For the actual measurement of the oil resistance, about 400 cm$^2$ (surface area of only one side) of the oxygen-absorbing film was cut out. A container with its open portion having a 200 cm$^2$ cross-sectional area was placed on the non-porous layer side of the oxygen-absorbing film, 400 cm$^3$ n-heptane (special grade article) was put in the container, and the non-porous layer and n-heptane were made to contact with each other and were left for one hour.

EXAMPLE 1

By using a mixture of 50 wt % ethylene-propylene-copolymer (TAFMER S-4030) and 50 wt % polypropylene (FX4D) as the non-porous layer, polypropylene (FX4D) as the resin component in the layer containing the barely-water-soluble filler and in the oxygen-absorbing layer, and polypropylene (FX4D) as the buffer layer, four layers were laminated by means of coextrusion in the construction and with thicknesses as follows: the non-porous layer (100 $\mu$m), the layer containing the barely-water-soluble filler (150 $\mu$m), the oxygen-absorbing layer (150 $\mu$m) and the buffer layer (300 $\mu$m).

Biaxial simultaneous drawing of these four layers was conducted at a temperature of 130° C. and at a ratio of three times in a lengthwise direction and three times in a widthwise direction. A summary of thickness of each layer after the drawing was: the non-porous layer: 10 $\mu$m; the porous layer: 55 $\mu$m; the porous oxygen-absorbing layer: 60 $\mu$m; and the buffer layer: 35 $\mu$m.

A corona discharge treatment with 3.6 kJ/m$^2$ (customary unit: 60 W/m$^2$/min) discharge energy was conducted on the surface of the buffer layer of the drawn four layers, and a nylon film was then bonded to the drawn four layers by using an adhesive agent for dry lamination (thickness after drying: about 10 $\mu$m), thereby producing the oxygen-absorbing film in the following six-layer construction: the non-porous layer, the porous layer, the porous oxygen-absorbing layer, the buffer layer, the adhesive layer and the gas-permeation-resistant layer.

The oxygen absorption time was 2.0 days, the leakage of iron was 0.06 ppm after 20 days and the leakage amount from the non-porous layer side to n-heptane was 0.08 mg per 1 cm$^2$.

EXAMPLE 2

By using a mixture of 70 wt % ethylene-propylene-copolymer (TAFMER P-0680) and 30 wt % linear low-density polyethylene (ULTZEX 2520F) as the non-porous layer, linear low-density polyethylene (ULTZEX 2520F) as the resin component in the layer containing the barely-water-soluble filler and in the oxygen-absorbing layer, and linear low-density polyethylene (ULTZEX 2520F) as the buffer layer, four layers were laminated by means of coextrusion in the construction and with thicknesses as follows: the non-porous layer (40 $\mu$m), the layer containing the barely-water-soluble filler (100 $\mu$m), the oxygen-absorbing layer (100 $\mu$m) and the buffer layer (200 $\mu$m).

Uniaxial drawing of these four layers was conducted at a temperature of 130° C. and at a ratio of four times in a lengthwise direction. A summary of thickness of each layer after the drawing was: the non-porous layer: 10 $\mu$m; the porous layer: 40 $\mu$m; the porous oxygen-absorbing layer: 40 $\mu$m; and the buffer layer: 50 $\mu$m.

A corona discharge treatment with 3.6 kJ/m$^2$ discharge energy was conducted on the surface of the buffer layer of the drawn four layers, and a nylon film was then bonded to the drawn four layers by using an adhesive agent for dry lamination (thickness after drying: about 10 $\mu$m), thereby producing the oxygen-absorbing film in the following six-layer construction: the non-porous layer, the porous layer, the porous oxygen-absorbing layer, the buffer layer, the adhesive layer and the gas-permeation-resistant layer.

The oxygen absorption time was 1.7 days, the leakage of iron was 0.09 ppm after 20 days and the leakage amount from the non-porous layer side to n-heptane was 0.02 mg per 1 cm$^2$.

EXAMPLE 3

By using 4-methyl-1-pentene-copolymer (TPX MX002) as the non-porous layer and the buffer layer, and 4-methyl-1-pentene copolymer (TPX MX002), as the resin component in the layer containing the barely-water-soluble filler and in the oxygen-absorbing layer, four layers were laminated by means of coextrusion in the construction and with thicknesses as follows: the non-porous layer (40 μm), the layer containing the barely-water-soluble filler (100 μm), the oxygen-absorbing layer (200 μm) and the buffer layer (100 μm).

Uniaxial drawing of these four layers was conducted at a temperature of 130° C. and at a ratio of four times in a lengthwise direction. A summary of thickness of each layer after the drawing was: the non-porous layer: 10 μm; the porous layer: 40 μm; the porous oxygen-absorbing layer: 80 μm; and the buffer layer: 25 μm.

A corona discharge treatment with 1.8 kJ/m² discharge energy was conducted on the surface of the buffer layer of the drawn four layers, and a nylon film was then bonded to the drawn four layers by using an adhesive agent for dry lamination (thickness after drying: about 10 μm), thereby producing the oxygen-absorbing film in the following six-layer construction: the non-porous layer, the porous layer, the porous oxygen-absorbing layer, the buffer layer, the adhesive layer and the gas-permeation-resistant layer.

The oxygen absorption time was 0.7 days, the leakage of iron was 0.12 ppm after 20 days and the leakage amount from the non-porous layer side to n-heptane was 0.30 mg per 1 cm².

EXAMPLE 4

By using a mixture (DYNARON H4800N) of hydrogenated-styrene-butadiene-copolymer and polypropylene as the non-porous layer, polypropylene (FX4D) as the resin component in the layer containing the barely-water-soluble filler and in the oxygen-absorbing layer, and polypropylene (FX4D) as the buffer layer, four layers were laminated by means of coextrusion in the construction and with thicknesses as follows: the non-porous layer (100 μm), the layer containing the barely-water-soluble filler (150 μm), the oxygen-absorbing layer (150 μm) and the buffer layer (300 μm).

Biaxial simultaneous drawing of these four layers was conducted at a temperature of 130° C. and at a ratio of three times in a lengthwise direction and three times in a widthwise direction. A summary of thickness of each layer after the drawing was: the non-porous layer: 10 μm; the porous layer: 55 μm; the porous oxygen-absorbing layer: 60 μm; and the buffer layer: 35 μm.

A corona discharge treatment with 3.6 kJ/m² discharge energy was conducted on the surface of the buffer layer of the drawn four layers, and a nylon film was then bonded to the drawn four layers by using an adhesive agent for dry lamination (thickness after drying: about 10 μm), thereby producing the oxygen-absorbing film in the following six-layer construction: the non-porous layer, the porous layer, the porous oxygen-absorbing layer, the buffer layer, the adhesive layer and the gas-permeation-resistant layer.

The oxygen absorption time was 1.3 days, the leakage of iron was 0.08 ppm after 20 days and the leakage amount from the non-porous layer side to n-heptane was 0.60 mg per 1 cm².

EXAMPLE 5

By using a mixture of 70 wt % ethylene-propylene-copolymer (TAFMER S-4030) and 30 wt % polypropylene (FX4D) as the non-porous layer, polypropylene (FX4D) as the resin component in the layer containing the barely-water-soluble filler and in the oxygen-absorbing layer, and polypropylene (FX4D) as the buffer layer, four layers were laminated by means of coextrusion in the construction and with thicknesses as follows: the non-porous layer (100 μm), the layer containing the barely-water-soluble filler (150 μm), the oxygen-absorbing layer (150 μm) and the buffer layer (300 μm).

Uniaxial drawing of these four layers was conducted at a temperature of 130° C. and at a ratio of six times in a lengthwise direction. A summary of thickness of each layer after the drawing was: the non-porous layer: 17 μm; the porous layer: 70 μm; the porous oxygen-absorbing layer: 80 μm; and the buffer layer: 50 μm.

A corona discharge treatment with 3.6 kJ/m² discharge energy was conducted on the surface of the buffer layer of the drawn four layers, and a nylon film was then bonded to the drawn four layers by using an adhesive agent for dry lamination (thickness after drying: about 10 μm), thereby producing the oxygen-absorbing film in the following six-layer construction: the non-porous layer, the porous layer, the porous oxygen-absorbing layer, the buffer layer, the adhesive layer and the gas-permeation-resistant layer.

The oxygen absorption time was 2.1 days, the leakage of iron was 0.09 ppm after 20 days and the leakage amount from the non-porous layer side to n-heptane was 0.45 mg per 1 cm².

EXAMPLE 6

By using a mixture of 70 wt % ethylene-propylene-copolymer (TAFMER S-4030) and 30 wt % polypropylene (FX4D) as the non-porous layer, polypropylene (FX4D) as the resin component in the layer containing the barely-water-soluble filler and in the oxygen-absorbing layer, and polypropylene (FX4D) as the buffer layer, four layers were laminated by means of coextrusion in the construction and with thicknesses as follows: the non-porous layer (100 μm), the layer containing the barely-water-soluble filler (150 μm), the oxygen-absorbing layer (150 μm) and the buffer layer (300 μm).

Biaxial simultaneous drawing of these four layers was conducted at a temperature of 130° C. and at a ratio of four times in a lengthwise direction and four times in a widthwise direction. A summary of thickness of each layer after the drawing was: the non-porous layer: 7 μm; the porous layer: 30 μm; the porous oxygen-absorbing layer: 35 μm; and the buffer layer: 20 μm.

A corona discharge treatment with 3.6 kJ/m² discharge energy was conducted on the surface of the buffer layer of the drawn four layers, and a nylon film was then bonded to the drawn four layers by using an adhesive agent for dry lamination (thickness after drying: about 10 μm), thereby producing the oxygen-absorbing film in the following six-layer construction: the non-porous layer, the porous layer, the porous oxygen-absorbing layer, the buffer layer, the adhesive layer and the gas-permeation-resistant layer.

The oxygen absorption time was 1.3 days, the leakage of iron was 0.08 ppm after 20 days and the leakage amount from the non-porous layer side to n-heptane was 0.24 mg per 1 cm².

EXAMPLE 7

By using ethylene-vinyl-acetate-copolymer (LV360) as the non-porous layer, linear low-density polyethylene (ULTZEX 2520F) as the resin component in the layer containing the barely-water-soluble filler and in the oxygen-absorbing layer, and linear low-density polyethylene (ULTZEX 2520F) as the buffer layer, four layers were laminated by means of coextrusion in the construction and thicknesses as follows: the non-porous layer (40 µm), the layer containing the barely-water-soluble filler (100 µm), the oxygen-absorbing layer (100 µm) and the buffer layer (200 µm).

Uniaxial drawing of these four layers was conducted at a temperature of 80° C. and at a ratio of four times in a lengthwise direction. A summary of thickness of each layer after the drawing was: the non-porous layer: 10 µm; the porous layer: 40 µm; the porous oxygen-absorbing layer: 40 µm; and the buffer layer: 50 µm.

A corona discharge treatment with 3.6 kJ/m$^2$ discharge energy was conducted on the surface of the buffer layer of the drawn four layers, and a nylon film was then bonded to the drawn four layers by using an adhesive agent for dry lamination (thickness after drying: about 10 µm), thereby producing the oxygen-absorbing film in the following six-layer construction: the non-porous layer, the porous layer, the porous oxygen-absorbing layer, the buffer layer, the adhesive layer and the gas-permeation-resistant layer.

The oxygen absorption time was 1.4 days, the leakage of iron was 0.07 ppm after 20 days and the leakage amount from the non-porous layer side to n-heptane was 0.01 mg per 1 cm$^2$.

EXAMPLE 8

By using a mixture of 70 wt % ethylene-propylene-copolymer (TAFMER S-4030) and 30 wt % polypropylene (FX4D) as the non-porous layer, diatomaceus earth as the barely-water-soluble filler, polypropylene (FX4D) as the resin component in the layer containing the barely-water-soluble filler and in the oxygen-absorbing layer, and polypropylene (FX4D) as the buffer layer, four layers were laminated by means of coextrusion in the construction and with thicknesses as follows: the non-porous layer (100 µm), the layer containing the barely-water-soluble filler (150 µm), the oxygen-absorbing layer (150 µm) and the buffer layer (300 µm).

Biaxial simultaneous drawing of these four layers was conducted at a temperature of 130° C. and at a ratio of three times in a lengthwise direction and three times in a widthwise direction. A summary of thickness of each layer after the drawing was: the non-porous layer: 10 µm; the porous layer: 55 µm; the porous oxygen-absorbing layer: 60 µm; and the buffer layer: 35 µm.

A corona discharge treatment with 3.6 kJ/m$^2$ discharge energy was conducted on the surface of the buffer layer of the drawn four layers, and a nylon film was then bonded to the drawn four layers by using an adhesive agent for dry lamination (thickness after drying: about 10 µm), thereby producing the oxygen-absorbing film in the following six-layer construction: the non-porous layer, the porous layer, the porous oxygen-absorbing layer, the buffer layer, the adhesive layer and the gas-permeation-resistant layer.

The oxygen absorption time was 1.2 days, the leakage of iron was 0.08 ppm after 20 days and the leakage amount from the non-porous layer side to n-heptane was 0.34 mg per 1 cm$^2$.

EXAMPLE 9

By using a mixture of 50 wt % ethylene-propylene-copolymer (TAFMER S-4030) and 50 wt % polypropylene (FX4D) as the non-porous layer, and polypropylene (FX4D) as the resin component in the layer containing the barely-water-soluble filler and in the oxygen-absorbing layer, three layers were laminated by means of coextrusion in the construction and with thicknesses as follows: the non-porous layer (100 µm), the layer containing the barely-water-soluble filler (150 µm) and the oxygen-absorbing layer (150 µm).

Biaxial simultaneous drawing of these three layers was conducted at a temperature of 130° C. and at a ratio of three times in a lengthwise direction and three times in a widthwise direction. A summary of thickness of each layer after the drawing was: the non-porous layer: 10 µm; the porous layer: 55 µm; and the porous oxygen-absorbing layer: 60 µm.

A nylon film was bonded to the drawn three layers on the porous oxygen-absorbing layer side by using an adhesive agent for dry lamination (thickness after drying: about 50 µm), thereby producing the oxygen-absorbing film in the following five-layer construction: the non-porous layer, the porous layer, the porous oxygen-absorbing layer, the adhesive layer and the gas-permeation-resistant layer (the lamination strength of the gas-permeation-resistant layer became sufficiently high).

The oxygen absorption time was 10 days. It seems that a part of or all the pores in the porous oxygen-absorbing layer and the porous layer were filled up with the adhesive agent. The leakage of iron was 0.06 ppm after 20 days and the leakage amount from the non-porous layer side to n-heptane was 0.08 mg per 1 cm$^2$.

EXAMPLE 10

By using a mixture of 70 wt % ethylene-propylene-copolymer (TAFMER P-0680) and 30 wt % linear low-density polyethylene (ULTZEX 2520F) as the non-porous layer, linear low-density polyethylene (ULTZEX 2520F) as the resin component in the layer containing the barely-water-soluble filler and in the oxygen-absorbing layer, linear low-density polyethylene (ULTZEX 2520F) as the buffer layer, adhesive polyolefine (ADMER NF300) as the adhesive layer, and nylon MXD (MX-NYLON 6007) as the gas-permeation-resistant layer, six layers were laminated by means of coextrusion in the construction and with thicknesses as follows: the non-porous layer (40 µm), the layer containing the barely-water-soluble filler (100 µm), the oxygen-absorbing layer (100 µm), the buffer layer (100 µm), the adhesive layer (20 µm) and the gas-permeation-resistant layer (100 µm).

Uniaxial drawing of these six layers was conducted at a temperature of 100° C. and at a ratio of four times in a lengthwise direction, thereby producing the oxygen-absorbing film. A summary of thickness of each layer after the drawing was: the non-porous layer: 10 µm; the porous layer: 40 µm; the porous oxygen-absorbing layer: 40 µm; the buffer layer: 25 µm; the adhesive layer: 5 µm; and the gas-permeation-resistant layer: 25 µm.

The oxygen absorption time was 1.7 days, the leakage of iron was 0.09 ppm after 20 days and the leakage amount from the non-porous layer side to n-heptane was 0.02 mg per 1 cm$^2$.

EXAMPLE 11

By using ethylene-propylene-copolymer (TAFMER P-0680) as the non-porous layer, linear low-density polyethylene (ULTZEX 2520F) as the resin component in the layer containing the barely-water-soluble filler and in the oxygen-absorbing layer, linear low-density polyethylene (ULTZEX 2520F) as the buffer layer, adhesive polyolefine (ADMER NF300) as the adhesive layer, and nylon MXD (MX-NYLON 6007) as the gas-permeation-resistant layer, six layers were laminated by means of coextrusion in the construction and with thicknesses as follows: the non-porous layer (40 µm), the layer containing the barely-water-soluble filler (100 µm), the oxygen-absorbing layer (100 µm), the buffer layer (100 µm), the adhesive layer (20 µm) and the gas-permeation-resistant layer (100 µm).

Uniaxial drawing of these six layers was conducted at a temperature of 100° C. and at a ratio of four times in a lengthwise direction, thereby producing the oxygen-absorbing film. A summary of thickness of each layer after the drawing was: the non-porous layer: 10 µm; the porous layer: 40 µm; the porous oxygen-absorbing layer: 40 µm; the buffer layer: 25 µm; the adhesive layer: 5 µm; and the gas-permeation-resistant layer: 25 µm.

The oxygen absorption time was 1.1 days, the leakage of iron was 0.13 ppm after 20 days. The leakage amount from the non-porous layer side to n-heptane was 0.56 mg per 1 cm², and the almost entire non-porous layer leaked out.

EXAMPLE 12

By using a mixture of 70 wt % ethylene-propylene-copolymer (TAFMER P-0680) and 30 wt % linear low-density polyethylene (ULTZEX 2520F) as the non-porous layer, linear low-density polyethylene (ULTZEX 2520F) as the resin component in the layer containing the barely-water-soluble filler and in the oxygen-absorbing layer, adhesive polyolefine (ADMER NF300) as the adhesive layer, and nylon MXD (MX-NYLON 6007) as the gas-permeation-resistant layer, five layers were laminated by means of coextrusion in the construction and with thicknesses as follows: the non-porous layer (40 µm), the layer containing the barely-water-soluble filler (100 µm), the oxygen-absorbing layer (100 µm), the adhesive layer (100 µm) and the gas-permeation-resistant layer (100 µm).

Uniaxial drawing of these five layers was conducted at a temperature of 100° C. and at a ratio of four times in a lengthwise direction, thereby producing the oxygen-absorbing film. A summary of thickness of each layer after the drawing was: the non-porous layer: 10 µm; the porous layer: 40 µm; the porous oxygen-absorbing layer: 40 µm; the adhesive layer: 25 µm; and the gas-permeation-resistant layer: 25 µm.

The oxygen absorption time was 1.7 days, the leakage of iron was 0.09 ppm after 20 days and the leakage amount from the non-porous layer side to n-heptane was 0.02 mg per 1 cm².

EXAMPLE 13

By using a mixture of 50 wt % ethylene-propylene-copolymer (TAFMER S-4030) and 50 wt % polypropylene (FX4D) as the non-porous layer, polypropylene (FX4D) as the resin component in the layer containing the barely-water-soluble filler and in the oxygen-absorbing layer, and polypropylene (FX4D) as the buffer layer, four layers were laminated by means of coextrusion in the construction and with thicknesses as follows: the non-porous layer (100 µm), the layer containing the barely-water-soluble filler (150 µm), the oxygen-absorbing layer (150 µm) and the buffer layer (800 µm).

Biaxial simultaneous drawing of these four layers was conducted at a temperature of 130° C. and at a ratio of three times in a lengthwise direction and three times in a widthwise direction. A summary of thickness of each layer after the drawing was: the non-porous layer: 10 µm; the porous layer: 55 µm; the porous oxygen-absorbing layer: 60 µm; and the buffer layer: 90 µm.

A lamination film of nylon and polypropylene (the polypropylene side in contact with the buffer layer) was laminated by means of thermal bond over the buffer layer side of the drawn four layers, thereby producing the oxygen-absorbing film in the following six-layer construction: the non-porous layer, the porous layer, the porous oxygen-absorbing layer, the buffer layer, the fusion layer (polypropylene) and the gas-permeation-resistant layer (nylon). However, heating by the thermal bond was conducted only from the nylon layer side, and temperatures and heating time were set so that the porous oxygen-absorbing layer and the porous layer would not be made non-porous as much as possible.

The oxygen absorption time was 2.3 days, the leakage of iron was 0.06 ppm after 20 days and the leakage amount from the non-porous layer side to n-heptane was 0.08 mg per 1 cm².

EXAMPLE 14

By using a mixture of 50 wt % ethylene-propylene-copolymer (TAFMER S-4030) and 50 wt % polypropylene (FX4D) as the non-porous layer, and polypropylene (FX4D) as the resin component in the layer containing the barely-water-soluble filler and in the oxygen-absorbing layer, three layers were laminated by means of coextrusion in the construction and with thicknesses as follows: the non-porous layer (100 µm), the layer containing the barely-water-soluble filler (150 µm) and the oxygen-absorbing layer (150 µm).

Biaxial simultaneous drawing of these three layers was conducted at a temperature of 130° C. and at a ratio of three times in a lengthwise direction and three times in a widthwise direction. A summary of thickness of each layer after the drawing was: the non-porous layer: 10 µm; the porous layer: 55 µm; and the porous oxygen-absorbing layer: 60 µm.

A lamination film of nylon and polypropylene (the polypropylene side in contact with the porous oxygen-absorbing layer) was laminated by means of thermal bond over the porous oxygen-absorbing layer side of the drawn three layers, thereby producing the oxygen-absorbing film in the following five-layer construction: the non-porous layer, the porous layer, the porous oxygen-absorbing layer, the fusion layer (polypropylene) and the gas-permeation-resistant layer (nylon). However, heating by the thermal bond was conducted only from the nylon layer side, and temperatures and heating time were set so that the porous oxygen-absorbing layer and the porous layer would not be made non-porous as much as possible.

The oxygen absorption time was 15 days. It seems that a part of or all the pores in the porous oxygen-absorbing layer and the porous layer were made non-porous due to heat. The leakage of iron was 0.06 ppm after 20 days and the leakage amount from the non-porous layer side to n-heptane was 0.08 mg per 1 cm².

EXAMPLE 15

By using linear low-density polyethylene (ULTZEX 2520F) as the non-porous layer and the buffer layer, and linear low-density polyethylene (ULTZEX 2520F) as the resin component in the layer containing the barely-water-soluble filler and in the oxygen-absorbing layer, four layers were laminated by means of coextrusion in the construction and with thicknesses as follows: the non-porous layer (40 μm), the layer containing the barely-water-soluble filler (100 μm), the oxygen-absorbing layer (100 μm) and the buffer layer (800 μm).

Uniaxial drawing of these four layers was conducted at a temperature of 100° C. and at a ratio of four times in a lengthwise direction. A summary of thickness of each layer after the drawing was: the non-porous layer: 10 μm; the porous layer: 40 μm; the porous oxygen-absorbing layer: 40 μm; and the buffer layer: 200 μm.

A layer of adhesive polyolefine (ADMER NF550) (thickness: 15 μm) and a layer of ethylene-vinyl-alcohol-copolymer (EVAL EP-E105) (thickness: 20 μm) were simultaneously laminated by means of coextrusion laminating over the buffer layer side of the drawn four layers, thereby producing the oxygen-absorbing film in the following six-layer construction: the non-porous layer, the porous layer, the porous oxygen-absorbing layer, the buffer layer, the adhesive resin layer (ADMER) and the gas-permeation-resistant layer (EVAL). However, coextrusion laminating was conducted at such resin melting temperatures and laminating speed that the porous oxygen-absorbing layer and the porous layer would not be made non-porous due to heat as much as possible.

The oxygen absorption time was 2.8 days, the leakage of iron was 0.07 ppm after 20 days and the leakage amount from the non-porous layer side to n-heptane was less than 0.01 mg per 1 cm$^2$.

EXAMPLE 16

By using a mixture of 50 wt % ethylene-propylene-copolymer (TAFMER S-4030) and 50 wt % polypropylene (FX4D) as the non-porous layer, and polypropylene (FX4D) as the resin component in the layer containing the barely-water-soluble filler and in the oxygen-absorbing layer, three layers were laminated by means of coextrusion in the construction and with thicknesses as follows: the non-porous layer (100 μm), the layer containing the barely-water-soluble filler (150 μm) and the oxygen-absorbing layer (150 μm).

Biaxial simultaneous drawing of these three layers was conducted at a temperature of 130° C. and at a ratio of three times in a lengthwise direction and three times in a widthwise direction. A summary of thickness of each layer after the drawing was: the non-porous layer: 10 μm; the porous layer: 55 μm; and the porous oxygen-absorbing layer: 60 μm.

A layer of adhesive polyolefine (ADMER NF550) (thickness: 15 μm) and a layer of ethylene-vinyl-alcohol-copolymer (EVAL EP-E105) (thickness: 20 μm) were simultaneously laminated by means of coextrusion laminating over the buffer layer side of the laminated three layers, thereby producing the oxygen-absorbing film in the following five-layer construction: the non-porous layer, the porous layer, the porous oxygen-absorbing layer, the adhesive resin layer (ADMER) and the gas-permeation-resistant layer (EVAL). However, coextrusion laminating was conducted at such resin melting temperatures and laminating speed that the porous oxygen-absorbing layer and the porous layer would not be made non-porous due to heat as much as possible.

The oxygen absorption time was 12 days. It seems that a part of or all the pores in the porous oxygen-absorbing layer and the porous layer were made non-porous due to heat. The leakage of iron was 0.07 ppm after 20 days and the leakage amount from the non-porous layer side to n-heptane was less than 0.01 mg per 1 cm$^2$.

EXAMPLE 17

By using a mixture of 50 wt % ethylene-propylene-copolymer (TAFMER S-4030) and 50 wt % polypropylene (FX4D) as the non-porous layer, polypropylene (FX4D) as the resin component in the layer containing the barely-water-soluble filler and in the oxygen-absorbing layer, and polypropylene (FX4D) as the buffer layer, four layers were laminated by means of coextrusion in the construction and with thicknesses as follows: the layer containing the barely-water-soluble filler (150 μm), the non-porous layer (100 μm), the oxygen-absorbing layer (150 μm) and the buffer layer (300 μm).

Biaxial simultaneous drawing of these four layers was conducted at a temperature of 130° C. and at a ratio of three times in a lengthwise direction and three times in a widthwise direction. A summary of thickness of each layer after the drawing was: the porous layer: 55 μm; the non-porous layer: 10 μm; the porous oxygen-absorbing layer: 60 μm; and the buffer layer: 35 μm.

A corona discharge treatment with 3.6 kJ/m$^2$ discharge energy was conducted on the surface of the buffer layer of the drawn four layers, and a nylon film was bonded to the drawn four layers by using an adhesive agent for dry lamination (thickness after drying: about 10 μm), thereby producing the oxygen-absorbing film in the following six-layer construction: the porous layer, the non-porous layer, the porous oxygen-absorbing layer, the buffer layer, the adhesive layer and the gas-permeation-resistant layer.

The oxygen absorption time was 2.1 days, the leakage of iron was 0.15 ppm after 20 days and the leakage amount from the porous layer side to n-heptane was 0.10 mg per 1 cm$^2$.

EXAMPLE 18

By using a mixture of 50 wt % ethylene-propylene-copolymer (TAFMER S-4030) and 50 wt % polypropylene (FX4D) as the non-porous layer, and polypropylene (FX4D) as the resin component in the layer containing the barely-water-soluble filler and in the oxygen-absorbing layer, five layers were laminated by means of successive extrusion (the layer containing the barely-water-soluble filler was first made into a film as a single layer, on one side of which the non-porous layer was laminated by means of extrusion coating, and then two sets of the two-layer films consisting of the layer containing the barely-water-soluble filler and the non-porous layer were used by placing them with their front side and back side at opposite positions, and the oxygen-absorbing layer was placed by means of extrusion laminating between the two sets of the two-layer films) in the construction and with thicknesses as follows: the non-porous layer (100 μm), the layer containing the barely-water-soluble filler (150 μm), the oxygen-absorbing layer (150 μm), the layer containing the barely-water-soluble filler (150 μm) and the non-porous layer (100 μm).

Biaxial simultaneous drawing of these five layers was conducted at a temperature of 130° C. and at a ratio of three times in a lengthwise direction and three times in a widthwise direction, thereby producing the oxygen-absorbing film of the both-side absorption type. A summary of thickness of each layer after the drawing was: the non-porous layer: 10 μm; the porous layer: 55 μm; the porous oxygen-absorbing layer: 60 μm; the porous layer: 55 μm; and the non-porous layer: 10 μm.

The oxygen absorption time was 1.0 days, the leakage of iron was 0.13 ppm after 20 days and the leakage amount from one non-porous layer side to n-heptane was 0.07 mg per 1 cm$^2$.

EXAMPLE 19

By using linear low-density polyethylene (ULTZEX 2520F) as the non-porous layer, and linear low-density polyethylene (ULTZEX 2520F) as the resin component in the layer containing the barely-water-soluble filler and in the oxygen-absorbing layer, five layers were laminated by means of coextrusion in the construction and with thicknesses as follows: the non-porous layer (40 μm), the layer containing the barely-water-soluble filler (100 μm), the oxygen-absorbing layer (100 μm), the layer containing the barely-water-soluble filler (100 μm) and the non-porous layer (40 μm).

Uniaxial drawing of these five layers was conducted at a temperature of 100° C. and at a ratio of four times in a lengthwise direction, thereby producing the oxygen-absorbing film of the both-side absorption type. A summary of thickness of each layer after the drawing was: the non-porous layer: 10 μm; the porous layer: 40 μm; the porous oxygen-absorbing layer: 40 μm; the porous layer: 40 μm; and the non-porous layer: 10 μm.

The oxygen absorption time was 1.3 days, the leakage of iron was 0.13 ppm after 20 days and the leakage amount from one non-porous layer side to n-heptane was less than 0.01 mg per 1 cm$^2$.

EXAMPLE 20

By using a mixture of 50 wt % ethylene-propylene-copolymer (TAFMER S-4030) and 50 wt % polypropylene (FX4D) as the non-porous layer, and polypropylene (FX4D) as the resin component in the layer containing the barely-water-soluble filler and in the oxygen-absorbing layer, three layers were laminated by means of coextrusion in the construction and with thicknesses as follows: the non-porous layer (100 μm), the layer containing the barely-water-soluble filler (150 μm) and the oxygen-absorbing layer (150 μm).

Biaxial simultaneous drawing of these three layers was conducted at a temperature of 130° C. and at a ratio of three times in a lengthwise direction and three times in a widthwise direction. A summary of thickness of each layer after the drawing was: the non-porous layer: 10 μm; the porous layer: 55 μm; and the porous oxygen-absorbing layer: 60 μm.

An attempt was made to produce the oxygen-absorbing film in the five-layer construction of the non-porous layer, the porous layer, the porous oxygen-absorbing layer, the adhesive layer and the gas-permeation-resistant layer by bonding a nylon film to the drawn three layers on the porous oxygen-absorbing layer side by using an adhesive agent for dry lamination (thickness after drying: about 10 μm). When the side to which the adhesive agent was applied was made the porous oxygen-absorbing layer side, the adhesive agent was considerably absorbed by the porous oxygen-absorbing layer. When the side to which the adhesive agent was applied was made the nylon film side, the contact area of the adhesive agent layer with the porous oxygen-absorbing layer became insufficient. In both cases, the gas-permeation-resistant layer came out to be easily peelable. Therefore, it was found that it is preferable to provide the aforementioned buffer layer in order to enhance adhesiveness between the oxygen-absorbing layer and the gas-permeation-resistant layer.

Comparative Example 1

By using polypropylene (FX4D) as the resin component in the layer containing the barely-water-soluble filler and in the oxygen-absorbing layer, and polypropylene (FX4D) as the buffer layer, three layers were laminated by means of coextrusion in the construction and with thicknesses as follows: the layer containing the barely-water-soluble filler (150 μm), the oxygen-absorbing layer (150 μm) and the buffer layer (300 μm).

Biaxial simultaneous drawing of these three layers was conducted at a temperature of 130° C. and at a ratio of three times in a lengthwise direction and three times in a widthwise direction. A summary of thickness of each layer after the drawing was: the porous layer: 55 μm; the porous oxygen-absorbing layer: 60 μm; and the buffer layer: 35 μm.

A corona discharge treatment with 3.6 kJ/m$^2$ discharge energy was conducted on the surface of the buffer layer of the drawn three layers, and a nylon film was then bonded to the drawn three layers by using an adhesive agent for dry lamination (thickness after drying: about 10 μm), thereby producing the oxygen-absorbing film in the following five-layer construction: the porous layer, the porous oxygen-absorbing layer, the buffer layer, the adhesive layer and the gas-permeation-resistant layer.

The oxygen absorption time was 0.6 days, the leakage of iron was 2 ppm after 20 days (26 ppm after 20 days when the oxygen-absorbing film was previously dipped in ethanol for about one minute before dipping in the hydrochloric acid aqueous solution) and the leakage amount from the gas-permeation-resistant layer side to n-heptane was less than 0.01 mg per 1 cm$^2$.

Comparative Example 2

By using a mixture of 50 wt % ethylene-propylene-copolymer (TAFMER S-4030) and 50 wt % polypropylene (FX4D) as the non-porous layer, polypropylene (FX4D) as the resin component in the oxygen-absorbing layer, and polypropylene (FX4D) as the buffer layer, three layers were laminated by means of coextrusion in the construction and with thicknesses as follows: the non-porous layer (100 μm), the oxygen-absorbing layer (150 μm) and the buffer layer (300 μm).

Biaxial simultaneous drawing of these three layers was conducted at a temperature of 130° C. and at a ratio of three times in a lengthwise direction and three times in a widthwise direction. A summary of thickness of each layer after the drawing was: the non-porous layer: 10 μm; the porous oxygen-absorbing layer: 60 μm; and the buffer layer: 35 μm.

A corona discharge treatment with 3.6 kJ/m$^2$ discharge energy was conducted on the surface of the buffer layer of the drawn three layers, and a nylon film was then bonded to the drawn three layers by using an adhesive agent for dry lamination (thickness after drying: about 10 μm), thereby producing the oxygen-absorbing film in the following five-layer construction: the non-porous layer, the porous oxygen-absorbing layer, the buffer layer, the adhesive layer and the gas-permeation-resistant layer.

The oxygen absorption time was 1.9 days, the leakage of iron was 1.1 ppm after 20 days, and the leakage amount from the non-porous layer side to n-heptane was 0.09 mg per 1 cm$^2$. As a result of observation with an optical microscope, a little amount of iron powder which penetrated through the non-porous layer was confirmed.

Comparative Example 3

By using a mixture of 50 wt % ethylene-propylene-copolymer (TAFMER S-4030) and 50 wt % polypropylene (FX4D) as the non-porous layer, polypropylene (FX4D) as the resin component in the layer containing the barelywater-soluble filler and in the oxygen-absorbing layer, and polypropylene (FX4D) as the buffer layer, four layers were laminated by means of coextrusion in the construction and with thicknesses as follows: the non-porous layer (25 μm), the layer containing the barely-water-soluble filler (20 μm), the oxygen-absorbing layer (150 μm) and the buffer layer (200 μm).

A corona discharge treatment with 3.6 kJ/m² discharge energy was conducted on the surface of the buffer layer of the four layers which were not drawn, and a nylon film was then bonded to the four layers by using an adhesive agent for dry lamination (thickness after drying: about 10 μm), thereby producing the oxygen-absorbing film in the following six-layer construction: the non-porous layer, the layer containing the barely-water-soluble filler, the oxygen-absorbing layer, the buffer layer, the adhesive layer and the gas-permeation-resistant layer.

The oxygen absorption time was 40 days, the leakage of iron was 0.03 ppm after 20 days, and the leakage amount from the non-porous layer side to n-heptane was 0.12 mg per 1 cm².

Comparative Example 4

By using polypropylene (FX4D) as the resin component in the layer containing the barely-water-soluble filler and in the oxygen-absorbing layer, and polypropylene (FX4D) as the buffer layer, three layers were laminated by means of coextrusion in the construction and with thicknesses as follows: the layer containing the barely-water-soluble filler (150 μm), the oxygen-absorbing layer (150 μm) and the buffer layer (300 μm).

Biaxial simultaneous drawing of these three layers was conducted at a temperature of 130° C. and at a ratio of three times in a lengthwise direction and three times in a widthwise direction. A summary of thickness of each layer after the drawing was: the porous layer: 55 μm; the porous oxygen-absorbing layer: 60 μm; and the buffer layer: 35 μm.

A corona discharge treatment with 3.6 kJ/m² discharge energy was conducted on the surface of the buffer layer of the drawn three layers, and a nylon film was then bonded to the drawn three layers by using an adhesive agent for dry lamination (thickness after drying: about 10 μm), thereby producing the following five-layer construction: the porous layer, the porous oxygen-absorbing layer, the buffer layer, the adhesive layer and the gas-permeation-resistant layer.

Moreover, an attempt was made to add the non-porous layer (thickness: 10 μm) on the porous layer side of the five-layer construction by means of extrusion coating by using a mixture of 50 wt % ethylene-propylene-copolymer (TAFMER S-4030) and 50 wt % polypropylene (FX4D). Probably due to insufficient quantity of heat of the melted resin and also due to slight unevenness of the porous layer portion, fusion could not be performed with the 10 μm thickness and the lamination was impossible.

Industrial Applicability

The oxygen-absorbing film and sheet of the present invention is a new oxygen absorbent which has both a high oxygen absorption speed and the capability to prevent contamination by the oxygen-absorbing component. The oxygen-absorbing film and sheet of this invention is applicable not only to a system which contains a small amount of liquid components and which has been a main object of conventional oxygen absorbers, but also to a system containing a large amount of various kinds of liquid components. The oxygen-absorbing film and sheet of this invention can be used to compose containers and packages which are aimed at preventing various kinds of products such as food, medicines and metal products, which easily deteriorate due to an influence of oxygen, from oxidizing. Moreover, this invention makes it possible to freely laminate the gas-permeation-resistant layer afterward with regard to such an oxygen-absorbing film and sheet and to enhance the applicability in manufacture of the gas-permeation-resistant layer portion and the use after lamination.

What is claimed is:

1. An oxygen-absorbing multilayered body, comprising a multilayered body with a plurality of resin layers laminated over one another to form at least one laminated side, said laminated side of this multilayered body being constructed as an oxygen-absorbing surface and, if there is a surface which is not an oxygen-absorbing surface said multilayered body being constructed as having a gas-permeation-resistant layer on said surface, said multilayered body including:

a porous oxygen-absorbing layer including an oxygen-absorbing component in a thermoplastic resin;

a non-porous oxygen-permeable layer which is permeable to oxygen; and a porous oxygen-permeable layer which serves as a protection layer for the non-porous oxygen-permeable layer, wherein on at least one side of said porous oxygen-absorbing layer one or more of said non-porous oxygen-permeable layer and one or more of said porous oxygen-permeable layer are combined and laminated over one another to form a laminate, and said resulting laminate is drawn to enlarge pores in said porous layers.

2. An oxygen-absorbing multilayered body according to claim 1, wherein said porous oxygen-permeable layer comprises a layer of a resin composition made by dispersing a filler in a thermoplastic resin.

3. An oxygen-absorbing multilayered body according to claim 1, wherein said oxygen-absorbing component contains iron powder as its main element.

4. An oxygen-absorbing multilayered body according to claim 1, wherein the oxygen permeability of said non-porous oxygen-permeable layer is $1 \times 10^{-11}$ through $6 \times 10^{-9}$ cm³/cm².sec.Pa.

5. An oxygen-absorbing multilayered body according to claim 1, wherein when the oxygen-absorbing surface side of said multilayered body is dipped in n-heptane, the leakage amount from the multilayered body is 0.3 mg or less per 1 cm² surface area.

6. An oxygen-absorbing multilayered body according to claim 1, wherein said multilayered body is formed in a sheet or film shape.

7. An oxygen-absorbing multilayered body according to claim 1, wherein only one side of said multilayered body is constructed as the oxygen-absorbing surface, and on one side of said oxygen-absorbing layer one or more said non-porous oxygen-permeable layers and one or more porous oxygen-permeable layers are combined and laminated over one another, and the gas-permeation-resistant layer is laminated over the non-oxygen-absorbing surface of said oxygen-absorbing layer, thereby said multilayered body is designed to absorb oxygen from one side of said oxygen-absorbing layer.

8. An oxygen-absorbing multilayered body according to claim 7, wherein said gas-permeation-resistant layer is laminated over said oxygen-absorbing layer through the intermediary of a buffer layer which enhances adhesion of the gas-permeation-resistant layer when it is laminated over the oxygen-absorbing layer.

9. An oxygen-absorbing multilayered body according to claim 1, wherein both sides of said multilayered body are constructed as the oxygen-absorbing surfaces, and on both sides of said oxygen-absorbing layer one or more said non-porous oxygen-permeable layers and one or more said porous oxygen-permeable layers are combined and laminated over one another.

10. An oxygen-absorbing multilayered body according to claim 1, wherein on at least one side of said oxygen-absorbing layer the porous oxygen-permeable layer and the non-porous oxygen-permeable layer are laminated in the order listed above as counted from the oxygen-absorbing layer.

11. An oxygen-absorbing multilayered body according to claim 1, wherein on at least one side of said oxygen-absorbing layer the non-porous oxygen-permeable layer and the porous oxygen-permeable layer are laminated in the order listed above as counted from the oxygen-absorbing layer.

12. An oxygen-absorbing multilayered body according to claim 1, wherein pores formed in said oxygen-absorbing layer and said porous layer are interlinked to each other.

13. An oxygen-absorbing multilayered body according to claim 1, wherein the volume density of the pores formed in said oxygen-absorbing layer and said porous layer in the entire layers ranges from 0.1 to 0.9.

14. The oxygen-absorbing multilayered body according to claim 1, wherein the volume density of the pores formed in said oxygen-absorbing layer and said porous layer in the entire layers ranges from 0.1 to 0.5.

15. An oxygen-absorbing multilayered body according to claim 1, wherein the thickness of said oxygen-absorbing layer is from 30 $\mu$m to 200 $\mu$m.

16. A method for manufacturing an oxygen absorbent which comprises a multilayered body with a plurality of thin resin layers laminated over one another, at least one laminated side of this multilayered body being constructed as an oxygen-absorbing surface and, if there is a surface which is not an oxygen-absorbing surface, said multilayered body being constructed as having a gas-permeation-resistant layer on said surface, comprising the steps of:
laminating said non-porous oxygen-permeable layer, said porous oxygen-permeable layer and said porous oxygen-absorbing layer to form a laminate, and
drawing said laminate to enlarge pores in said porous layers.

17. A method according to claim 16, wherein uniaxial or biaxial drawing of said multilayered body is connected at least in an uniaxial direction to a ratio of twice through twenty times on an area conversion basis.

18. A method for manufacturing an oxygen absorbent according to claim 16, wherein said porous oxygen-permeable layer comprises a thin layer of a resin composition which is made by dispersing a granular water-soluble filler in a thermoplastic resin.

19. A method for manufacturing an oxygen absorbent according to claim 16, wherein said multilayered body is made by combining and laminating one or more said non-porous oxygen-permeable layers and one or more said porous oxygen-permeable layers on one side of said oxygen-absorbing layer and by laminating the gas-permeation-resistant layer on the other side of said oxygen-absorbing layer.

20. A method according to claim 19, wherein said multilayered body is formed by laminating a buffer layer between said oxygen-absorbing layer and said gas-permeation-resistant layer.

21. A method according to claim 16, wherein said multilayered body is formed by combining one or more said non-porous oxygen-permeable layers and one or more said porous oxygen-permeable layers on both sides of said oxygen-absorbing layer.

22. An oxygen-absorbing multilayered body comprising:
a porous oxygen-absorbing layer comprising an oxygen-absorbing component and a thermoplastic resin;
non-porous oxygen-permeable layers which are permeable to oxygen; and
porous oxygen-permeable layers which serve as protection layers for the non-porous oxygen-permeable layers,
wherein said non-porous oxygen-permeable layers and said porous oxygen-permeable layers are provided in this order on both sides of said oxygen-absorbing layer, and
wherein the non-porous layers, the porous layers, and the porous oxygen-absorbing layers are laminated and are then drawn to enlarge pores in said porous layers, thereby forming the oxygen-absorbing multilayered body.

23. An oxygen-absorbing multilayered body comprising:
a porous oxygen-absorbing layer comprising an oxygen-absorbing component and a thermoplastic resin;
porous oxygen-permeable layers which serve as protection layers for the non-porous oxygen-permeable layers;
non-porous oxygen-permeable layers which are permeable to oxygen;
wherein said porous oxygen-permeable layers and said non-porous oxygen-permeable layers are provided in this order on both sides of said oxygen-absorbing layer, and
wherein the porous layers, the non-porous layers, and the porous oxygen-absorbing layer are laminated and are then drawn to enlarge pores in said porous layers, thereby forming the oxygen-absorbing multilayered body.

24. A method for manufacturing an oxygen-absorbing multilayered body which includes a porous oxygen-absorbing layer comprising an oxygen-absorbing component and a thermoplastic resin; a non-porous oxygen-permeable layer which is permeable to oxygen; and a porous oxygen-permeable layer which serves as a protection layer for the non-porous oxygen-permeable layer, comprising the steps of:
providing said non-porous oxygen-permeable layer and said porous oxygen-permeable layer on both sides of said oxygen-absorbing layer, and
laminating the non-porous layer, the porous layer, and the porous oxygen-absorbing layer to form a laminate, and
drawing the resulting laminate to enlarge pores in said porous layers.

25. An oxygen-absorbing multilayered body comprising, in the order listed below:
a gas-permeation-resistant layer;
a porous oxygen-absorbing layer comprising an oxygen-absorbing component and a thermoplastic resin;
a porous oxygen-permeable layer comprising a filler and a thermoplastic resin; and
a non-porous oxygen-permeable layer made of at least one thermoplastic resin selected from a group consisting of homopolymers and copolymers of polyethylene, polypropylene, poly-1-butene, poly-4-methyl-1-pentene, ethylene-vinyl-acetate-copolymer, polybutadiene, polyisoprene, styrene-butadiene-copolymer and hydrogenated form thereof, and any modified form and graft form of the above-listed resins, said non-porous oxygen-permeable layer being heat-sealable, wherein on at least one side of said porous oxygen-absorbing layer one or more of said non-porous oxygen-permeable layer and one or more of said porous oxygen-permeable layer are combined and laminated over one another to form a laminate, and the resulting laminate is drawn to enlarge pores in said porous layers.

26. A method for manufacturing an oxygen-absorbing multilayered body which comprises, in the order listed below:

a gas-permeation-resistant layer made of gas-permeation-resistant resin;

a porous oxygen-absorbing layer comprising an oxygen-absorbing component and a thermoplastic resin;

a porous oxygen-permeable layer comprising a filler and a thermoplastic resin; and a non-porous oxygen-permeable layer being heat-sealable, wherein the non-porous layer, the porous layer, the porous oxygen-absorbing layer and the gas-permeation resistant layer are formed by being laminated and then drawn to enlarge pores in said porous layers.

27. A method for manufacturing an oxygen-absorbing multilayered body which comprises, in the order listed below:

a gas-permeation-resistant layer;

a porous oxygen-absorbing layer comprising an oxygen-absorbing component and a thermoplastic resin; and a porous oxygen-permeable layer comprising a filler and a thermoplastic resin, wherein a non-porous layer, the porous layer and the porous oxygen-absorbing layer are formed by being laminated and then drawn to form a layered body to enlarge pores in said porous layers, and subsequently the gas-permeation-resistant layer is laminated thereon.

* * * * *